(12) United States Patent
Cao et al.

(10) Patent No.: US 10,951,384 B2
(45) Date of Patent: Mar. 16, 2021

(54) CHANNEL BONDING MODE SIGNALING FOR PUNCTURED CHANNELS

(71) Applicant: NXP USA, Inc., Austin, TX (US)

(72) Inventors: Rui Cao, Fremont, CA (US); Hongyuan Zhang, Fremont, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/435,899

(22) Filed: Jun. 10, 2019

(65) Prior Publication Data

US 2019/0296884 A1    Sep. 26, 2019

Related U.S. Application Data

(63) Continuation of application No. 15/628,535, filed on Jun. 20, 2017, now Pat. No. 10,320,551.

(Continued)

(51) Int. Cl.
*H04L 5/00* (2006.01)
*H04W 24/02* (2009.01)
(Continued)

(52) U.S. Cl.
CPC ............ *H04L 5/0094* (2013.01); *H04L 5/001* (2013.01); *H04L 5/0005* (2013.01); *H04L 5/0098* (2013.01); *H04W 24/02* (2013.01); *H04W 36/16* (2013.01); *H04W 72/0406* (2013.01); *H04W 72/0453* (2013.01); *H04W 84/12* (2013.01);
(Continued)

(58) Field of Classification Search
CPC ..... H04L 5/0094; H04L 5/001; H04L 5/0098; H04L 5/0005; H04L 5/0041; H04L 5/0044; H04W 84/18; H04W 72/0453; H04W 72/0406; H04W 36/16; H04W 84/12; H04W 24/02; H04W 72/042;
(Continued)

(56) References Cited

U.S. PATENT DOCUMENTS 9,912,452 B2    3/2018  Chen et al.
10,231,225 B2 *  3/2019  Bharadwaj ............ H04W 72/12
(Continued)

OTHER PUBLICATIONS

John Son et al., "Flexible Wider Bandwidth Transmission", IEEE 802.11-16/0045r1, Jan. 19, 2016, Slides 1-15.
(Continued)

*Primary Examiner* — Nam T Huynh

(57) ABSTRACT

A wireless communication device comprising processor electronics configured to select a channel bonding mode from a plurality of channel bonding modes. Each of the plurality of channel bonding modes indicates at least two wireless communication channels and at least one of the plurality of channel bonding modes corresponds to a mode that indicates a punctured wireless communication channel. The processor electronics are further configured to generate a frame to be transmitted from the wireless communication device in accordance with the selected channel bonding mode. The frame includes a preamble portion and a data portion and the preamble portion includes a first preamble field that identifies the selected channel bonding mode. Transceiver electronics are configured to transmit the frame on the wireless communication channels indicated by the selected channel bonding mode identified in the first preamble field.

16 Claims, 12 Drawing Sheets

Related U.S. Application Data

(60) Provisional application No. 62/365,622, filed on Jul. 22, 2016, provisional application No. 62/352,726, filed on Jun. 21, 2016.

(51) Int. Cl.
*H04W 36/16* (2009.01)
*H04W 72/04* (2009.01)
*H04W 84/12* (2009.01)
*H04W 84/18* (2009.01)

(52) U.S. Cl.
CPC ........... *H04W 84/18* (2013.01); *H04L 5/0041* (2013.01); *H04L 5/0044* (2013.01)

(58) Field of Classification Search
CPC ............. H04W 72/0446; H04W 88/08; H04W 74/006; H04W 74/002; H04W 72/04
See application file for complete search history.

(56) References Cited

U.S. PATENT DOCUMENTS

| | | |
|---|---|---|
| 2015/0373587 A1 | 12/2015 | Josiam et al. |
| 2016/0044533 A1 | 2/2016 | Seok |
| 2016/0316473 A1 | 10/2016 | Wang et al. |
| 2017/0006608 A1 | 1/2017 | Josiam et al. |
| 2018/0375632 A1* | 12/2018 | Kim ................. H04L 5/0053 |

OTHER PUBLICATIONS

Jinsoo Ahn et al., "OFDMA Non-contiguous Channel Utiization", IEEE 802.11-15/0353r1, Mar. 10, 2015, Slides 1-14.
International Application No. PCT/182017/053720, Notification of Transmittal of the International Search Report and the Written Opinion of the International Searching Authority, dated Sep. 4, 2017, 16 pages.
IEEE P802.11ax/D0.2 Draft Standard for Information technology—Telecommunications and information exchange between systems Local and metropolitan area networks—Specific requirements, IEEE Computer Society, Jun. 2016.
U.S. Appl. No. 15/628,535, filed Jun. 20, 2017, Rui Cao et al.

* cited by examiner

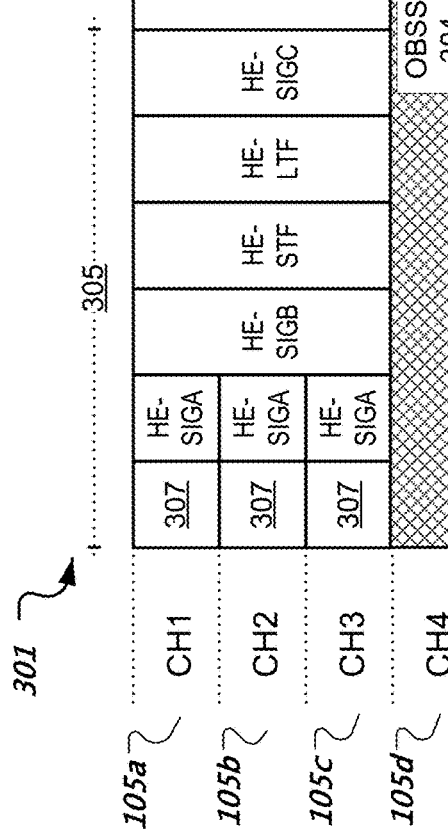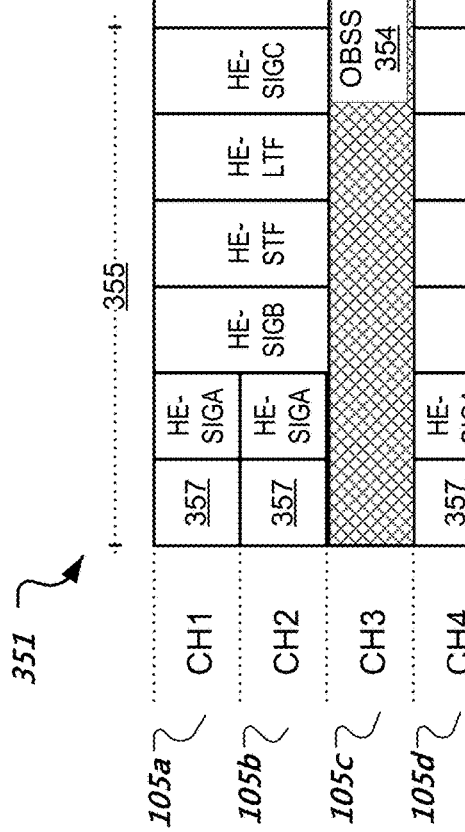

| 8μs | 8μs | 4μs | 4μs | 8μs | 4μs per symbol | 4μs | Variable durations per HE-LTF symbol | | |
|---|---|---|---|---|---|---|---|---|---|
| L-STF | L-LTF | L-SIG | RL-SIG | HE-SIG-A | HE-SIG-B | HE-STF | HE-LTF | ... HE-LTF | Data | PE |

CHANNEL BONDING MODE SIGNALING FOR PUNCTURED CHANNELS

CROSS-REFERENCE TO RELATED APPLICATIONS

The present disclosure is a continuation of U.S. patent application Ser. No. 15/628,535, filed on Jun. 20, 2017 (now U.S. Pat. No. 10,320,551), which claims the benefit of U.S. Provisional Application No. Application Ser. No. 62/352,726, filed on Jun. 21, 2016, and entitled "HE Channel Bonding Design and Signaling" and claims benefit of the priority of U.S. Provisional Application Ser. No. 62/365,622, filed on Jul. 22, 2016, and entitled "HE Channel Bonding Design and Signaling." The entire disclosures of the applications referenced above are incorporated herein by reference.

BACKGROUND

This disclosure relates to wireless communication systems, including Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices which can be referred to as client stations (STAs), client devices, clients, access terminals (ATs). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as Orthogonal Frequency Division Multiplexing (OFDM) for the physical (PHY) layer. In an OFDM based wireless communication system, a data stream is split into multiple data substreams. Such data substreams are sent over different OFDM subcarriers, which are commonly referred to as tones or frequency tones. WLANs such as those defined in the Institute of Electrical and Electronics Engineers (IEEE) wireless communications standards, (e.g., IEEE 802.11a, IEEE 802.11n, and IEEE 802.11ac, or any other standard by any other organization) can use OFDM to transmit and receive signals. Some wireless communication systems can use Orthogonal Frequency-Division Multiple Access (OFDMA) to enable different devices to communicate on different subsets of subcarriers at the same time.

Wireless communication devices in a WLAN can use one or more protocols for a medium access control (MAC) layer and a physical (PHY) layer. For example, a wireless communication device can use a Carrier Sense Multiple Access (CSMA) with Collision Avoidance (CA) based protocol for a MAC layer and OFDM for the PHY layer. The MAC layer can communicate with a Physical Layer Convergence Protocol (PLCP) sublayer. After receiving a MAC protocol data unit (MPDU) from the MAC layer, the PLCP sublayer can include PHY specific preamble fields to form a PLCP protocol data unit (PPDU) for transmission. A MPDU can also be called a PLCP service data unit (PSDU).

SUMMARY

The present disclosure includes systems and techniques for wireless communications. According to an aspect of the present disclosure, a technique for wireless communications includes a device that includes an interface to access a wireless medium of a wireless local area network (WLAN); and processor electronics coupled with the interface, wherein the processor electronics are configured to: identify a channel bonding mode out of a number of channel bonding modes, the channel bonding mode including two or more available channels used by the apparatus in the WLAN, and the two or more available channels indicating at least one busy channel not used by the apparatus for data transmission; signal, to a receiver, the channel bonding mode using a bandwidth field of a legacy signal field that is duplicated across respective channels used in the WLAN, the legacy signal field being in a preamble portion of a frame; and control, via the interface, a transmission of the frame to the receiver, wherein the frame includes a data portion of the frame that occupies the two or more available channels according to the channel bonding mode.

This and other implementations can include one or more of the following features. In some implementations, the processor electronics are configured to control sensing of a group of channels for a channel contention operation that acquires, from the group of channels, the two or more available channels and detects the at least one busy channel; and determine the channel bonding mode based on the channel contention operation.

In some implementations, the processor electronics are configured to control, via the interface, a transmission of an indication of capability for supporting each of the number of channel bonding modes to the receiver during an association phase of the apparatus and the receiver.

In some implementations, the legacy signal field is a high efficiency (HE) signal A field (HE-SIGA) defined in accordance with an Institute of Electrical and Electronics Engineers (IEEE) 802.11ax protocol of a frame, and the bandwidth field of the legacy signal field is a 3-bit field.

In some implementations, the number of channel bonding modes include: a first channel bonding mode spanning over a bandwidth of 80 MHz, including a primary 20 MHz channel and a secondary 40 MHz channel used by the apparatus for data transmission, and indicating a secondary 20 MHz channel not used by the apparatus for data transmission; a second channel bonding mode spanning over a bandwidth of 80 MHz, including a primary 20 MHz channel and a second 20 MHz channel of a secondary 40 MHz channel, and indicating a secondary 20 MHz channel and a first 20 MHz channel of the secondary 40 MHz channel not used by the apparatus for data transmission; a third channel bonding mode spanning over a bandwidth of 160 MHz, including a primary 20 MHz channel, a secondary 40 MHz channel, and a secondary 80 MHz channel, and indicating a secondary 20 MHz channel not used by the apparatus for data transmission; and a fourth channel bonding mode spanning over a bandwidth of 160 MHz, including a primary 20 MHz channel, a secondary 20 MHz channel, and a secondary 80 MHz channel, and indicating a secondary 40 MHz channel not used by the apparatus for data transmission.

In some implementations, the processor electronics are configured to signal the channel bonding mode using the 3-bit field of the HE-SIGA field by signaling the channel bonding mode using the 3-bit field of the HE-SIGA field and a HE-SIGB field.

According to another aspect of the present disclosure, a technique for wireless communications includes a device that includes an interface to access a wireless medium of a wireless local area network (WLAN); and processor electronics coupled with the interface, wherein the processor electronics are configured to: receive a frame via a group of channels associated with the wireless medium, the frame including a preamble portion and a data portion, the preamble portion including a legacy signal field that is duplicated across respective channels used by the apparatus in the WLAN, the legacy signal field including a bandwidth field that indicates a channel bonding mode out of a number of channel bonding modes, the channel bonding mode including two or more available channels used by the apparatus in the WLAN, and the two or more available channels indicating at least one busy channel not used by the apparatus for data transmission; decode the channel bonding mode from the bandwidth field of the legacy signal field; determine the two or more available channels out of the group of channels based on the channel bonding mode; and decode the data portion of the frame that occupies the two or more available channels.

This and other implementations can include one or more of the following features. In some implementations, the legacy signal field is a high efficiency (HE) signal A field (HE-SIGA) defined in accordance with an Institute of Electrical and Electronics Engineers (IEEE) 802.11ax protocol of a frame, and the bandwidth field of the legacy signal field is a 3-bit field.

In some implementations, the number of channel bonding modes include: a first channel bonding mode spanning over a bandwidth of 80 MHz, including a primary 20 MHz channel and a secondary 40 MHz channel used by the apparatus for data transmission, and indicating a secondary 20 MHz channel not used by the apparatus for data transmission; a second channel bonding mode spanning over a bandwidth of 80 MHz, including a primary 20 MHz channel and a second 20 MHz channel of a secondary 40 MHz channel, and indicating a secondary 20 MHz channel and a first 20 MHz channel of the secondary 40 MHz channel not used by the apparatus for data transmission; a third channel bonding mode spanning over a bandwidth of 160 MHz, including a primary 20 MHz channel, a secondary 40 MHz channel, and a secondary 80 MHz channel, and indicating a secondary 20 MHz channel not used by the apparatus for data transmission; and a fourth channel bonding mode spanning over a bandwidth of 160 MHz, including a primary 20 MHz channel, a secondary 20 MHz channel, and a secondary 80 MHz channel, and indicating a secondary 40 MHz channel not used by the apparatus for data transmission.

According to another aspect of the present disclosure, a technique for wireless communications includes a method that includes identifying, by a transmitter for a wireless local area network (WLAN), a channel bonding mode out of a number of channel bonding modes, the channel bonding mode including two or more available channels used by the transmitter for data transmission in the WLAN, and the two or more available channels indicating at least one busy channel not used by the transmitter for data transmission; signaling, to a receiver, the channel bonding mode using a bandwidth field of a legacy signal field that is duplicated across respective channels used in the WLAN, the legacy signal field being in a preamble portion of a frame; and transmitting the frame to the receiver, wherein the frame includes a data portion of the frame that occupies the two or more available channels according to the channel bonding mode.

This and other implementations can include one or more of the following features. In some implementations, the legacy signal field is a high efficiency (HE) signal A field (HE-SIGA) defined in accordance with an Institute of Electrical and Electronics Engineers (IEEE) 802.11ax protocol of a frame.

In some implementations, the bandwidth field of the legacy signal field is a 3-bit field. In some implementations, the at least one busy channel is in between the two or more available channels such that the two or more available channels form a non-continuous channel grouping.

In some implementations, each of the number of channel bonding modes includes available channels, and the available channels include at least a high efficiency (HE) signal B field (HE-SIGB) content channel 1 and at least a HE-SIGB content channel 2.

In some implementations, identifying the channel bonding mode out of the number of channel bonding modes includes identifying the channel bonding mode from a set of: a first channel bonding mode spanning over a bandwidth of 80 MHz, including a primary 20 MHz channel and a secondary 40 MHz channel used by the transmitter for data transmission, and indicating a secondary 20 MHz channel not used by the transmitter for data transmission; a second channel bonding mode spanning over a bandwidth of 80 MHz, including a primary 20 MHz channel and a second 20 MHz channel of a secondary 40 MHz channel, and indicating a secondary 20 MHz channel and a first 20 MHz channel of the secondary 40 MHz channel not used by the transmitter for data transmission; a third channel bonding mode spanning over a bandwidth of 160 MHz, including a primary 20 MHz channel, a secondary 40 MHz channel, and a secondary 80 MHz channel, and indicating a secondary 20 MHz channel not used by the transmitter for data transmission; and a fourth channel bonding mode spanning over a bandwidth of 160 MHz, including a primary 20 MHz channel, a secondary 20 MHz channel, and a secondary 80 MHz channel, and indicating a secondary 40 MHz channel not used by the transmitter for data transmission.

In some implementations, the method further includes transmitting an indication of capability for supporting each of the number of channel bonding modes to the receiver during an association phase of the transmitter and the receiver.

In some implementations, signaling the channel bonding mode using the bandwidth field of the legacy signal field includes signaling the channel bonding mode using the bandwidth field of a HE-SIGA field and using a HE-SIGB field.

In some implementations, the channel bonding mode includes: a primary channel bonding mode of a primary 80 MHz channel, and a secondary channel bonding mode of a secondary 80 MHz channel; and wherein signaling the channel bonding mode using the bandwidth field of the HE-SIGA field and the HE-SIGB field includes: signaling the primary channel bonding mode of the primary 80 MHz channel using the bandwidth field of the HE-SIGA field; and signaling the secondary channel bonding mode of the secondary 80 MHz channel using a resource allocation field of the HE-SIGB field.

In some implementations, the channel bonding mode includes: a first channel bonding mode of a first subset of channels, and a second channel bonding mode of a second subset of channels; wherein signaling the channel bonding mode using the bandwidth field of the HE-SIGA field and the HE-SIGB field includes: signaling the first channel bonding mode of the first subset of channels using the bandwidth field of the HE-SIGA field; and signaling the second channel bonding mode of the second subset of channels using a resource allocation field of the HE-SIGB field, the resource allocation field of the HE-SIGB field indicating whether each of the second subset of channels is used by the transmitter for data transmission.

In some implementations, the first channel bonding mode is one of four channel bonding modes, each of the four channel bonding modes includes available channels, and the available channels include at least a HE-SIGB content channel 1 and at least a HE-SIGB content channel 2.

In some implementations, the first channel bonding mode of the first subset of channels includes the first channel bonding mode from a set of: a third channel bonding mode spanning over a bandwidth of 80 MHz, including a primary 20 MHz channel and a secondary 40 MHz channel used by the transmitter for data transmission, and indicating a secondary 20 MHz channel not used by the transmitter for data transmission; a fourth channel bonding mode spanning over a bandwidth of 80 MHz, including a primary 20 MHz channel, a secondary 20 MHz channel, and one 20 MHz channel of a secondary 40 MHz channel, and indicating another 20 MHz channel of the secondary 40 MHz channel not used by the transmitter for data transmission; a fifth channel bonding mode spanning over a bandwidth of 160 MHz, including a primary 20 MHz channel, a secondary 40 MHz channel, and indicating a secondary 20 MHz channel not used by the transmitter for data transmission; and a sixth channel bonding mode spanning over a bandwidth of 160 MHz, including a primary 20 MHz channel, a secondary 20 MHz channel, and at most one 20 MHz channel of a secondary 40 MHz channel, and indicating at least one other 20 MHz channel not used by the transmitter for data transmission.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Particular configurations of the technology described in this disclosure can be implemented so as to realize one or more of the following potential advantages. A described channel bonding mechanism can allow for more flexible and more adaptive channel size selections in a dynamic and high density environment. A described channel bonding mechanism can allow for more usable channel bandwidth with additional new PHY channel bonding modes for different channel sizes. A described channel bonding mechanism can leverage and reuse a legacy preamble field for signaling various channel bonding modes without introducing additional signaling overhead.

Details of one or more implementations are set forth in the accompanying drawings and the description below. Other features and advantages may be apparent from the description and drawings, and from the claims.

BRIEF DESCRIPTION OF DRAWINGS

FIGS. 3A and 3B show a layout of different examples of a frame for downlink OFDMA based channel bonding on a 80 MHz operational channel.

FIG. 5 shows a layout of an example of a PPDU format defined in IEEE 802.11ax.

Like reference symbols in the various drawings indicate like elements.

DESCRIPTION

Figure 1:
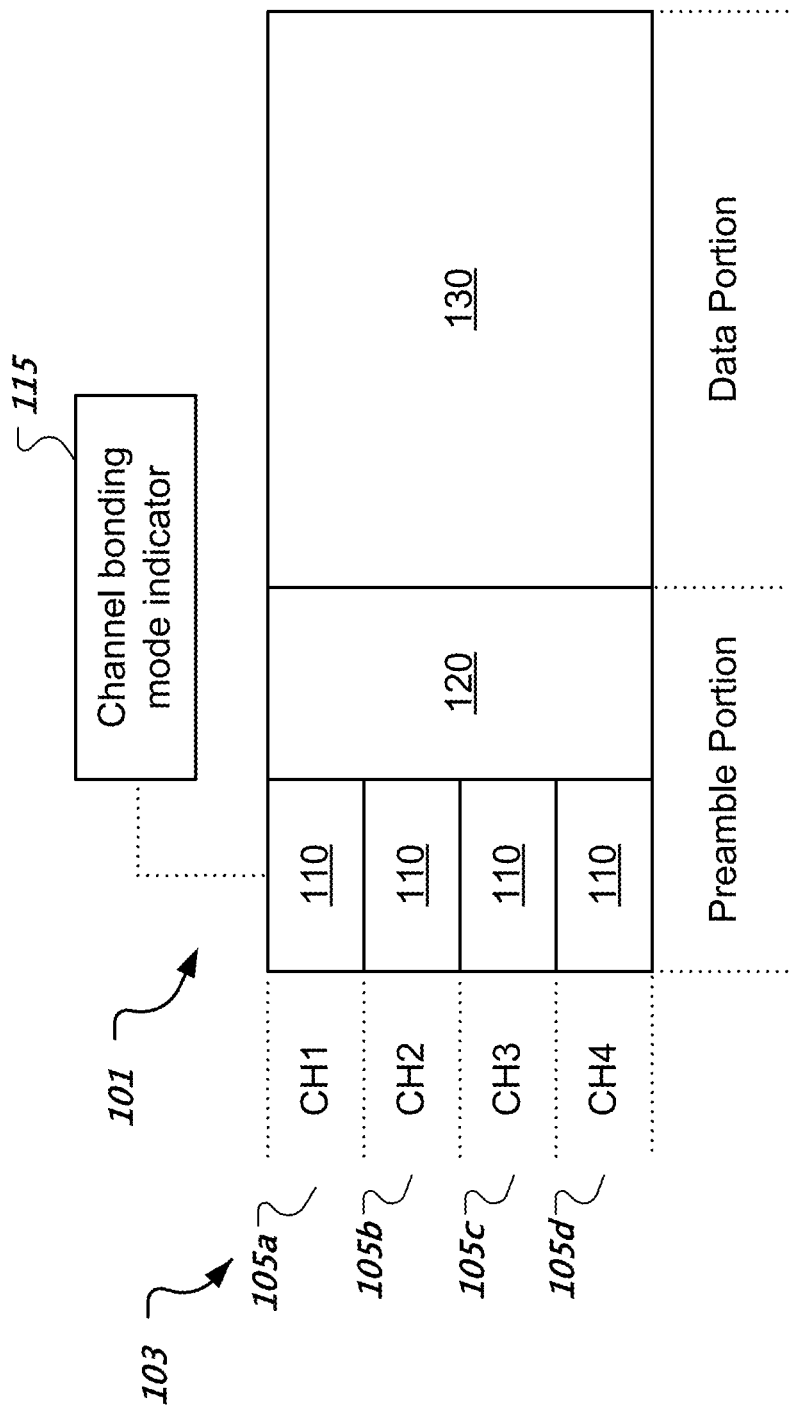
FIG. 1 shows a layout of an example of a frame that includes a channel bonding mode indicator.

Channel bonding (CB), also called channel aggregation, allows a device to operate on a wider operational channel containing multiple basic channel units in a frequency band. The device may not gain access to the full channel bandwidth of the wider operational channel, because one or more unit channels are busy and thus currently unavailable, e.g., in use by another device and hence there is an Overlapping Basic Service Set (OBSS). The device can use a channel bonding mechanism to aggregate channels that are available. Channel bonding is an effective technique to improve channel usage.

In some channel bonding mechanisms such as those in IEEE 802.11 based WLAN systems for 2.4 GHz and 5 GHz frequency bands, the 20 MHz channel is commonly used as the basic channel unit. IEEE 802.11n, 802.11ac, and IEEE 802.11ax have defined additional wider operational channels, e.g., 40 MHz, 80 MHz, 160 MHz, or 80+80 MHz channel. Such a wider operational channel can include multiple 20 MHz channels and can have its own set of PHY characteristics such as fast Fourier transform (FFT) size, number of data tones, number of edge tones, number of pilot tones, basic service set (BSS). IEEE 802.11ax, also called High Efficiency WLAN (HEW), is designed for better transmission efficiency and to improve performance in dense environments. IEEE 802.11ax can further improve channel usage of IEEE 802.11ac and allow a signal to be transmitted on non-contiguous channels within a traditional bandwidth definition.

Operational channel size can refer to the channel bandwidth on which a radio interface is operating given a set of PHY characteristics, e.g., a 80 MHz BSS with a 1024-point FFT. Available channels, also called used channels, acquired channels, or bonded channels, associated with a channel bonding operation can refer to the channels that a device contended for and gained access to. OBSS channels, also called busy channels, can refer to the channels that a device contended for but did not gain access to. A component channel associated with a channel bonding operation can refer to an available channel that a device selects and signals for use within the wider operational channel.

Various designs of channel bonding for different channel bandwidths and corresponding signaling schemes are described. The various designs and signaling schemes can be used, for example, in IEEE 802.11ax systems or other next generation WLAN systems that support channel bonding. Some of various designs and signaling schemes are also compatible with legacy systems, for example, IEEE 802.11ac systems. In some implementations, various channel bonding modes can be designed. A channel bonding mode indicates a possible busy/available combination of the group of channels. For example, a channel bonding mode can include two or more available channels used by a device for data transmission and can also indicate one or more busy channels that are not used by the device for data transmission in the WLAN. For example, when contending for a full operational channel, a device (e.g., an AP) may sometimes acquire less than the full operational channel, e.g., may acquire three out of four 20 MHz channels, for downlink and uplink communications. The channel bonding mode indicates which three out of four 20 MHz channels the device has acquired and used for data transmission.

Signaling schemes are described for informing a receiver of a channel bonding mode that indicates the available channels used by a transmitter for data transmission. Upon receiving the channel bonding mode, the receiver can properly decode the data transmitted by the device on the available channels. In some implementations, a subset of possible channel bonding modes out of all possible busy/available combinations of the group of channels are predetermined and selected. The selected subset of channel bonding modes are mapped to specific codes (e.g., bit sequences). In some implementations, the selected channel bonding modes have one or more desirable properties (e.g., high spectral efficiency). The signaling of the channel bonding mode can thus use only a fixed, limited number of bits, which helps simplify system design and implementation. In some implementations, the AP can transmit the mappings to one or more devices (e.g., STAs) to enable a device to properly interpret a received channel bonding mode indicator. For example, the AP can select one of these codes to be a channel bonding mode indicator for a particular frame.

In some implementations, the channel bonding mode is signaled by reusing or otherwise leveraging one or more existing signaling fields in a preamble portion of a frame. By using the existing signaling fields, the disclosed signaling schemes impose no additional signaling overhead for channel bonding while still maintaining proper operation of the device and complying with other signaling specification of the standards (e.g., IEEE 802.11ax protocol). Given that an existing legacy field typically has a defined number of bits, it may only be used to signal a limited number of channel bonding modes. As such, in some implementations, a specific number of channel bonding modes out of the total number of theoretically possible channel bonding modes are selected. The subset of the specific number of channel bonding modes can be mapped to bit sequences of the defined number of bits of the existing legacy field. As one example, a channel bonding mode can be signaled by a channel bonding mode indicator using a 3-bit bandwidth (BW) field of a high efficiency (HE) signal "A" field (HE SIG-A, HE-SIG-A, or HE-SIGA) of an HE PPDU in a HE multi-user (MU) format defined in IEEE 802.11ax. As another example, a channel bonding mode can be signaled by a channel bonding mode indicator using both a HE-SIGA field and a HE signal "B" field (HE SIG-B, HE-SIG-B, or HE-SIGB) of an HE PPDU in the HE-MU format. In some implementations, the overall bandwidth (e.g., 80 MHz operational or 160 MHz operational) is implied in the channel bonding mode so that no additional bandwidth indicator is needed.

In some implementations, the AP can use an OFDMA-based channel bonding mechanism which can cause a device, such as an AP, client device, or both, to generate an OFDM waveform based on a channel bandwidth that corresponds to the full operational channel bandwidth, e.g., 80 MHz, using PHY parameters of the full operational channel, e.g., FFT size, tone plan, OFDMA sub-channelization, and allocation mechanisms. The OFDMA-based channel bonding mechanism can further cause the device, such as an AP, client device, or both, to introduce null subcarriers within the OFDM waveform that correspond to a busy channel, which provides for OFDMA and minimizes interference to the busy channel. For example, the AP can use the available 20 MHz channels to carry information and to not use any busy 20 MHz channels to carry information. Further, through one or more uplink allocations, the AP can cause the client devices to use the available 20 MHz channels to carry information and to not use any busy 20 MHz channels to carry information. Not using a busy channel can include setting tones corresponding to the busy channel to null. The available channels within an allocation can be continuous or non-continuous within a frequency band.

FIG. 1 shows a layout of an example of a frame 101 that includes a channel bonding mode indicator 115. An AP can contend for multiple channels 105a, 105b, 105c, and 105d (labelled CH1, CH2, CH3, and CH4) that are parts of a wider operational channel 103. After gaining access, the AP can transmit a frame 101 that uses the channels 105a-d. The frame 101 can include a duplicated preamble portion 110, a non-duplicated preamble portion 120, and a data portion 130. The duplicated preamble portion 110 can enable backwards compatibility with devices that only support the channel size of an individual channel 105a-d rather than the channel size of the wider operational channel 103. As shown, the duplicated preamble portion 110 is duplicated on each of the channels 105a-d. The duplicated preamble portion 110 can include a channel bonding mode indicator 115. The channel bonding mode indicator 115 can signal which ones of the channels 105a-d are component channels. These component channels are used to carry the non-duplicated preamble portion 120 and the data portion 130 of the frame 101. Note that if channel contention is unsuccessful for one or more channels 105a-d, each deemed to be a busy channel, the AP can set subcarriers that correspond to each busy channel to null.

Figure 2:
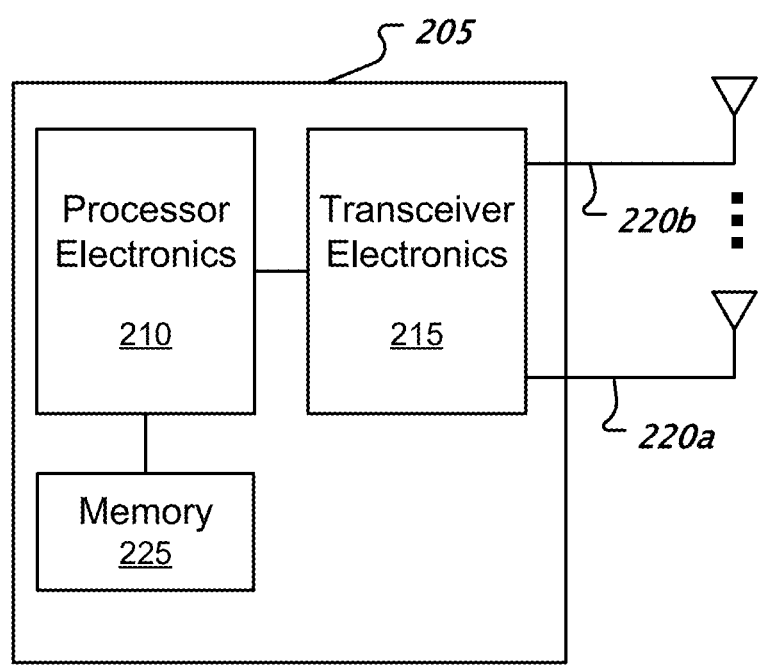
FIG. 2 shows a block diagram of a wireless communication device.

FIG. 2 shows a block diagram of a wireless communication device 205. The device 205 can include processor electronics 210 such as one or more processors that implement methods effecting the techniques presented in this disclosure. Various examples of device 205 include an AP or a client device. An AP can also be referred to as a base station (BS). A client device can also be referred to as a STA or mobile station (MS). In some implementations, the device 205 can be operated as an AP or as a client depending on a configuration parameter. The device 205 can include transceiver electronics 215 to send and receive wireless signals over one or more antennas 220*a-b*. In some implementations, transceiver electronics 215 can include multiple radio units. In some implementations, a radio unit includes a baseband unit (BBU) and a radio frequency unit (RFU) to transmit and receive signals. In some implementations, the device 205 includes dedicated circuitry for transmitting and dedicated circuitry for receiving. The device 205 can include one or more memories 225 configured to store information such as data and/or instructions. For example, a memory 225 can include instructions to perform a channel bonding operation. In some implementations, the device 205 can include an interface, such as a bus, a serial communication link, pins, electrical contacts points, or a combination thereof, coupled between the processor electronics 210 and the transceiver electronics 215.

FIG. 3A shows a layout of an example of a frame 301 for downlink, OFDMA based, continuous channel bonding on an 80 MHz operational channel. In this example, the AP contends for the entire 80 MHz operational channel, which includes channels CH1, CH2, CH3, and CH4, but only gains channels CH1, CH2, and CH3. These three channels form a continuous available channel grouping. In more detail, the AP conducts carrier sensing on each 20 MHz channel of the entire 80 MHz operational channel, and identifies the available channels (e.g., CH1, CH2, and C3), which in this case, provide 60 MHz of available bandwidth. The AP detected traffic on channel CH4 and has deemed it to be a busy channel 304, e.g., there is an OBSS caused by another device. The AP can generate and transmit a frame 301 that spans all of the channels including the busy channel 304. For example, the frame 301 can be transmitted via an OFDMA signal using the entire 80 MHz operational channel. The frame 301 includes null subcarriers corresponding to the busy channel 304, e.g., CH4, to minimize interference to the busy channel 304. In some implementations, the AP can signal null subcarrier allocations in a downlink resource allocation.

The frame 301 can include a preamble portion 305 and a data portion 310. After the frame 301, there can be a period for acknowledgements 315. The preamble portion 305 can include a legacy preamble 307 that includes a legacy short training field (L-STF), a legacy long training field (L-LTF), and a legacy signal field (L-SIG). The preamble portion 305 can include a HE-SIG-A, a HE-SIG-B, a HE short training field (HE-STF), and one or more HE long training fields (HE-LTFs). In some implementations, the preamble portion 305 can include a HE signal "C" field (HE-SIG-C).

The legacy preamble 307, including L-STF, L-LTF, and L-SIG, can be duplicated on each of the available 20 MHz channels. Further, a HE-SIG-A preamble can be duplicated on each of the available 20 MHz channels. The duplication allows legacy devices, which are expecting a 20 MHz bandwidth signal, to receive and decode one or more of the duplicated preambles. This example can be applied to other cases such as where CH2, CH3, and CH4 are available, but CH1 is not available. This example can be applied to different layouts of primary 20, secondary 20, and secondary 40 channels.

FIG. 3B shows a layout of an example of a frame 351 for downlink OFDMA based non-continuous channel bonding on an 80 MHz operational channel. In this example, the AP contends for the entire 80 MHz operational channel, which includes channels CH1, CH2, CH3, and CH4, but only gains channels CH1, CH2, and CH4. These three channels form a non-continuous available channel grouping, since CH3, the busy channel 354, causes a split among the available channels. In more detail, the AP conducts carrier sensing on each 20 MHz channel of the entire 80 MHZ operational channel, and identifies the available channels (e.g., CH1, CH2, and C4). The AP detected traffic on channel CH3 and has deemed it to be a busy channel 354, e.g., there is an OBSS. The AP can generate and transmit a frame 351 that spans all of the channels including the busy channel 354. To minimize interference to the busy channel 354, the AP can include null subcarriers corresponding to the busy channel 354. Thus, while the frame 351 occupies an 80 MHz bandwidth signal, there is only 60 MHz of bandwidth available for data since 20 MHz is unavailable due to the included null subcarriers. The frame 351 can include a preamble portion 355 and a data portion 360. The preamble portion 355 can include a legacy preamble 357 that is duplicated on each of the available channels (e.g., CH1, CH2, and C4), but not duplicated on the busy channel 354. After an end of the frame 351, there can be a period for acknowledgements 365.

Wireless communication systems can use channel bonding together with OFDMA for the downlink (from AP to client), the uplink (from client to AP), or both. With an OFDMA based system, each client device can be allocated with a portion of the overall operational channel via a resource allocation. In some implementations, a resource allocation can specify a number of OFDM tone blocks. In some implementations, the allocation can specify a number of sub-channels. The allocation can also identify which of the tone blocks are assigned to a STA. In some implementations, OFDM tones can be partitioned into multiple resource units (RUs). The AP can allocate each of the multiple RUs to one or more client devices for transmission of data to, or by, the one or more of the client devices.

To schedule one or more uplink OFDMA transmissions, an AP can use a downlink trigger frame to signal uplink resource allocations to the client devices. In OFDMA-based channel bonding, the downlink trigger frame can be required to be correctly received and decoded by the client devices, even when one or more OBSS channels are part of the full OFDMA operational channel. If a downlink trigger frame is in a Null Data Packet (NDP) frame, e.g., uplink resource allocation signals are encoded in HE-SIGB, then the HE-SIGB can be required to be received and decoded by the client devices in the available channels for channel bonding. In some implementations, a downlink trigger frame can be included in a MAC frame, e.g., uplink resource allocation signals are encoded in a MAC frame. The MAC frame with the allocation can be transmitted as a legacy PPDU, can be transmitted in the primary 20 MHz channel, and can be duplicated on each available 20 MHz channel used in the channel bonding. In some implementations, the MAC frame with the resource allocation can be transmitted as a HE-PPDU. The HE-PPDU can be transmitted in a downlink broadcast resource allocation. In some implementations, the uplink resource allocations can be transmitted in the 20 MHz primary channel, and can be duplicated on each remaining 20 MHz channel used in the channel bonding.

Figure 4A:
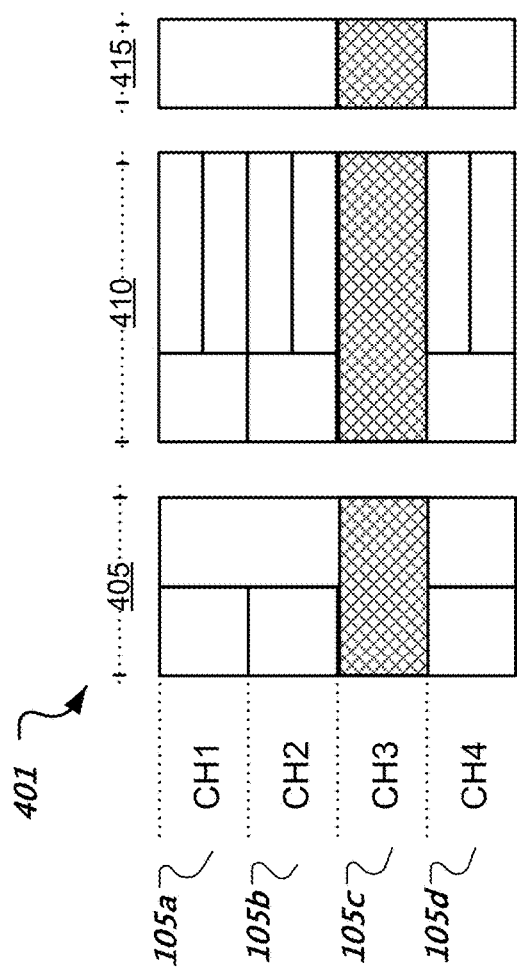
FIGS. 4A and 4B show an example of a sequence of frame exchanges among an access point and client devices that include an uplink OFDMA based channel bonded frame.

FIG. 4A shows an example of a sequence 401 of frame exchanges among an AP and client devices that include an uplink OFDMA based channel bonded frame. The sequence 401 shows a downlink (DL) trigger frame 405, uplink (UL) multi-user (MU) PPDU 410, and downlink acknowledgement 415. The AP can contend and gain the entire 80 MHz operational channel or a portion thereof. In this example, while contending for the 80 MHz operational channel, the AP only gains access for CH1, CH2, and CH4 to form a non-continuous available channel grouping. This grouping is used for both downlink and uplink exchanges within the sequence 401. Despite being transmitted on the full 80 MHz operational channel, the non-continuous available channel grouping provides 60 MHz of usable bandwidth, and less if there are guard tones. Note that if CH4 was busy and CH3 was available, it would form a continuous available channel grouping. The downlink trigger frame 405 can include information about the available channels for channel bonding. The downlink trigger frame 405 can include an uplink resource allocation for the uplink multi-user PPDU 410. In some implementations, the uplink resource allocation signals the available channels for channel bonding. In some implementations, the downlink acknowledgement 415 can be a block acknowledgement.

Figure 4B:
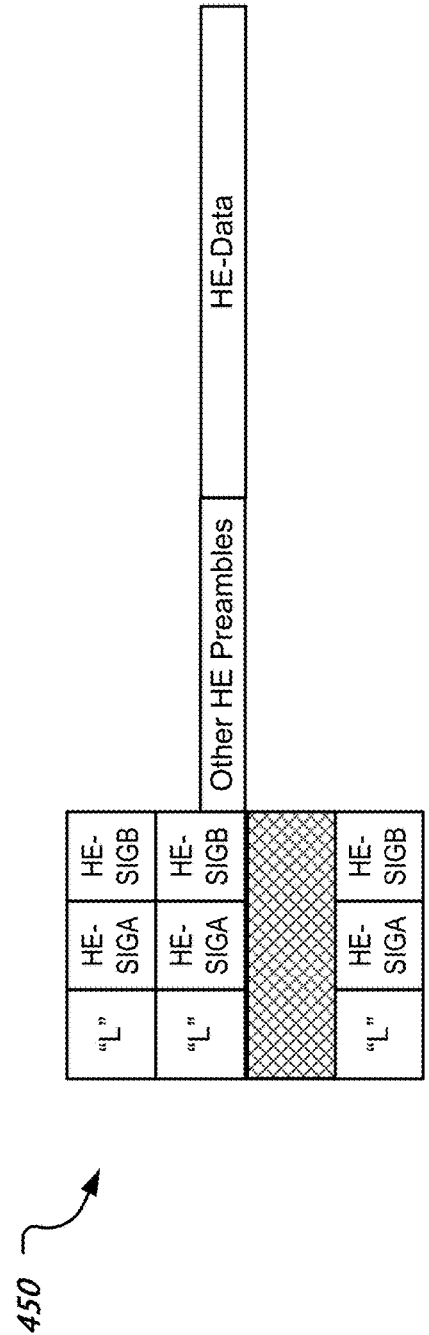

FIG. 4B shows an example of the uplink PPDU 450 from one client device. The PPDU 450 can include duplicated legacy ("L") preambles and duplicated HE preambles. The PPDU 450 can include a non-duplicated portion that includes one or more other HE preambles and HE data. Subcarriers for the non-duplicated portion of the uplink PPDU 450 transmission can be selected based on a multi-user uplink resource allocation included in the downlink trigger frame 405. The unallocated subcarriers for the non-duplicated portion of the uplink PPDU 450 transmission can be set to null.

FIG. 5 shows a layout 501 of an example of a HE multi-user (MU) PPDU format defined in IEEE 802.11ax. The layout 501 can be an example of the frame 301 or 351 shown in FIG. 3. The layout 501 includes an L-STF, an L-LTF, an L-SIG, a Repeated Legacy Signal Field (RL-SIG), a HE-SIG-A, a HE-SIG-B, a HE-STF, one or more HE-LTF, payload data, and a Packet Extension (PE). HE-SIG-A is transmitted on each 20 MHz channel, and the HE-SIG-A content is repeated on each 20 MHz channel. The HE SIG-A field includes multiple subfields indicating HE PPDU transmission parameters of the device, such as a bandwidth (BW), a modulation and coding scheme, a number of data streams, a coding type, etc. HE-SIG-B is encoded on each 20 MHz channel. If the channel bandwidth is larger than 20 MHz, the HE-SIG-B on all 20 MHz channels of even indices shares the same content, and is named content channel 1 (HE-SIG-B-CC1). The HE-SIG-B on all 20 MHz channels of odd indices shares the same content, and is named content channel 2 (HE-SIG-B-CC2). Each HE-SIG-B content channel includes a common field and a user-specific field. The common field contains RU allocation bits for each 20 MHz channel that is covered by the corresponding content channel. The RU allocation bits have the capability to signal no content allocation on each 20 MHz.

Figure 6:
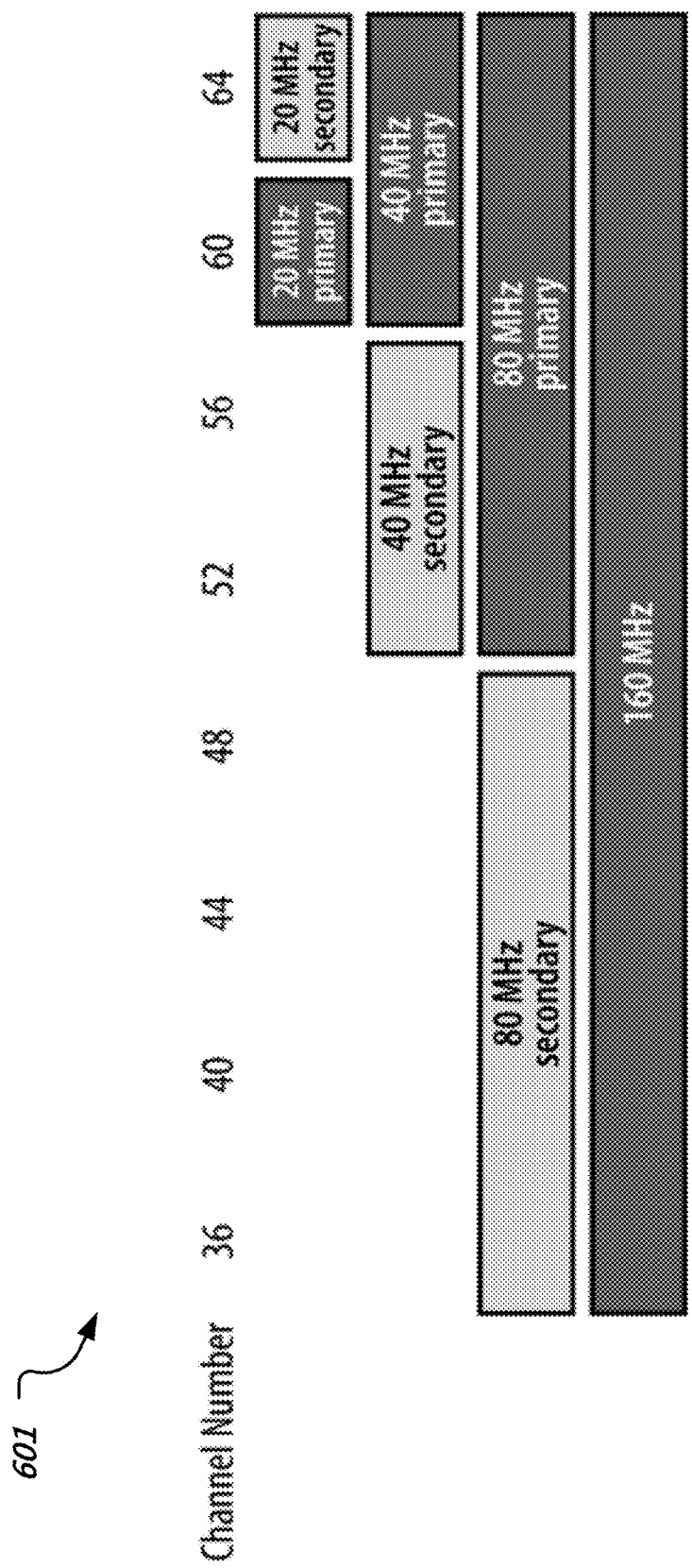
FIG. 6 shows an example of a configuration of primary and secondary channels with different channel bandwidths.

FIG. 6 shows an example of a configuration 601 of primary and secondary channels with different channel bandwidths. The primary and secondary channels with different channel bandwidths can serve as component channels for channel bonding. Each of the primary and secondary channels has a corresponding channel number for identification. The primary and secondary channels can correspond to channel numbers different than those in FIG. 6 in some other implementations.

In the configuration 601, a primary 20 MHz channel (P20) corresponds to channel 60, while a secondary 20 MHz channel (S20) corresponds to channel 64. A primary 40 MHz channel (P40) includes two 20 MHz channels, i.e., P20 and S20 that correspond to channels 60 and 64, respectively. A secondary 40 MHz channel (S40) includes two 20 MHz channels that correspond to channels 52 and 56. A primary 80 MHz channel (P80) includes two 40 MHz channels, i.e., P40 and S40, namely, four 20 MHz channels that correspond to channels 52, 56, 60, and 64. A secondary 80 MHz channel (S80) includes four 20 MHz channels that correspond to channels 36, 40, 44, and 48. A 160 MHz channel includes two 20 MHz channels, i.e., P80 and S80, namely, eight 20 MHz channels that correspond to channels 36, 40, 44, 48, 52, 56, 60, and 64.

Under a legacy WLAN system (e.g., IEEE 802.11ac-based systems), the network will transmit 20 MHz frames on channel 60. To transmit a 40 MHz frame on its 40 MHz primary channel, both channels 60 and 64 need to be free. To transmit an 80 MHz frame, the four channels 52 through 64 all need to be free. Finally, to transmit a 160 MHz frame, all eight channels from 36 through 64 need to be free.

For channel bonding, to detect available and busy channels, the AP can perform a Clear Channel Assessment (CCA). The CCA is a logical function in the PHY layer that determines the current use state of a wireless medium. The PHY layer can report CCA indications to a higher layer. In legacy WLAN systems, the PHY layer can issue a PHY-CCA.indication (IDLE) primitive to indicate that the current operating channel is available to access, e.g., the entire 80 MHz channel is available for a BSS operating at 80 MHz. Further, the PHY layer can issue a PHY-CCA.indication (BUSY, {channel_list}) primitive to indicate one of the following: if channel_list=primary, the primary channel (P20) is busy; if channel_list=secondary, the secondary channel (S20) is busy, while the primary channel (P20) is available; if channel_list=secondary40, the secondary 40 MHz channel (S40) is busy, while the primary and secondary channels (P20 and S20) are available; if channel_list=secondary80, the secondary 80 MHz channel (S80) is busy, while the primary, secondary, and secondary40 channels (P20, S20 and S40) are available.

In some implementations, PHY layer CCA indications can be modified to support OFDMA based channel bonding. For OFDMA based channel bonding, CCA indications issued by the PHY layer can include the state of each component channel in the channel bonding. The component channels can be defined as channel units in channel bonding. For example, the device can be configured to have per-20 MHz energy detection (ED) capability so that its PHY layer can issue the CCA indications that include the state of each 20 MHz channel (i.e., each of the channels 36, 40, 44, 48, 52, 56, 60, and 64 in FIG. 6) in the case of channel bonding. For example, in a case of an 80 MHz OFDMA based channel bonding with four 20 MHz component channels (e.g., channels 52, 56, 60, and 64 in FIG. 6) for channel bonding, the CCA indications can indicate whether each of the channel 52, 56, 60, and 64 is busy or not.

Figure 7:
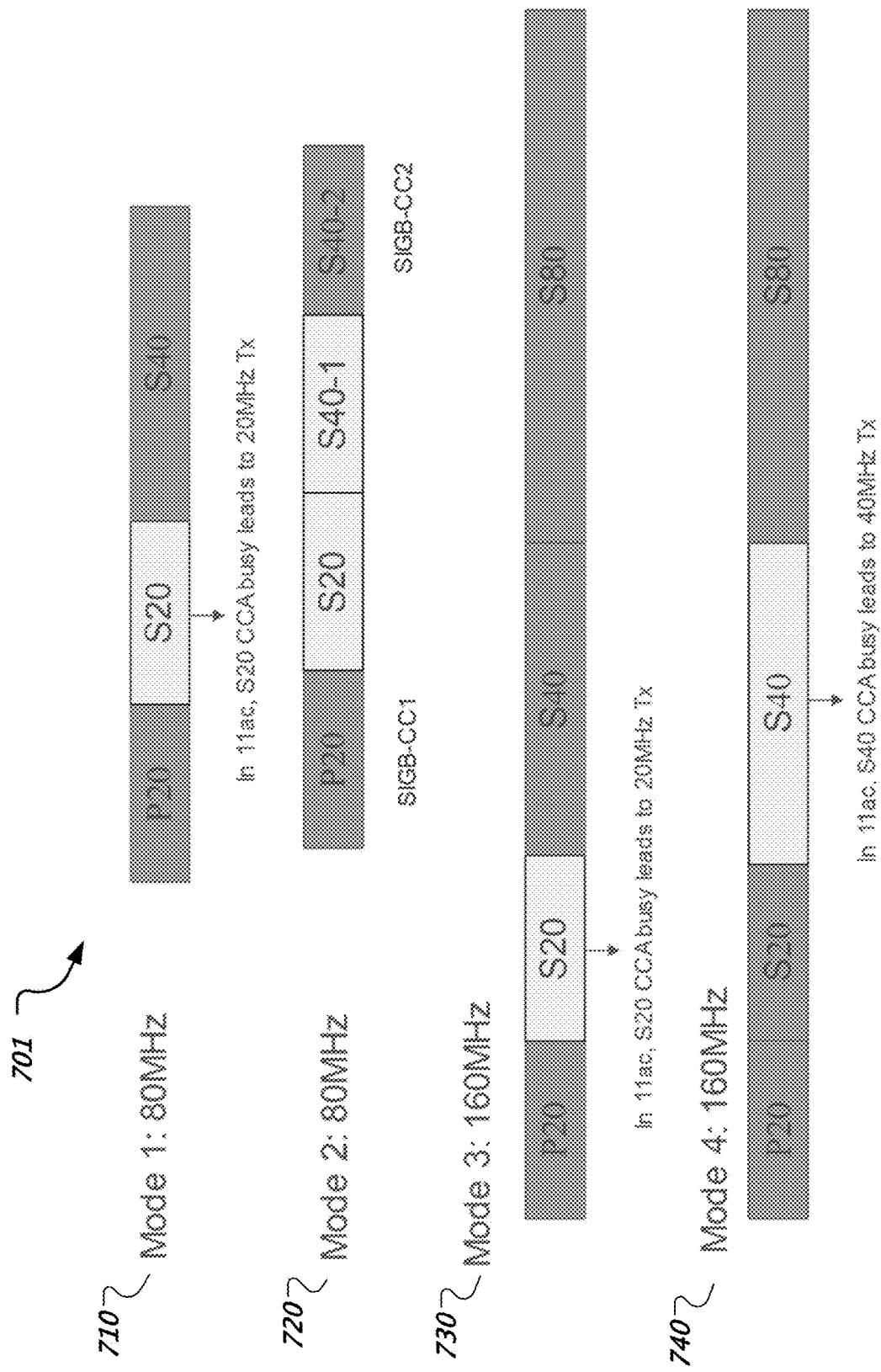
FIG. 7 shows an example of a selected set of channel bonding modes that can be signaled by a BW field of a HE-SIGA field.

FIG. 7 shows an example of a selected set 701 of four channel bonding modes 710, 720, 730, and 740 that can be signaled by a BW field of a HE-SIGA field. As defined in IEEE 802.11ax, the HE SIG-A field includes a 3-bit BW field but only 2 bits are currently used for indicating one of four operating bandwidth options (i.e., 20 MHz, 40 MHz, 80

MHz, and 160 MHz). As such, up to 4 channel bonding modes can be signaled by using the 3-bit BW field of the HE SIG-A field only. As an example, the BW field of a value of 4 (e.g., represented by bit sequence "100") indicates that only the secondary 20 MHz is not present in 80 MHz signal; the BW field value of 5 indicates that only one of the two 20 MHz sub-channels in secondary 40 MHz is not present in 80 MHz signal; the BW field value of 6 indicates that only secondary 20 MHz is not present in primary 80 MHz of 160 MHz, or 80+80 MHz signal; the BW field value of 7 indicates that the primary 40 MHz is present in the primary 80 MHz of 160 MHz or 80+80 MHz signal. The four channel bonding modes 710, 720, 730, and 740 are selected because they achieve the most improvement on spectrum efficiency compared to other channel bonding modes in legacy systems (e.g., IEEE 802.11ac systems). Additional or different channel bonding modes can be selected and signaled by the 3-bit BW field of the HE SIG-A field only.

For example, each of mode 1 and mode 2 is a 80 MHz OFDMA based channel bonding mode. In mode 1 710, the S20 is a busy channel while P20 and S40 are available channels. Thus mode 1 710 can transmit data over an aggregated bandwidth of 60 MHz, which improves the spectral efficiency by 3 times compared to the legacy systems that only allow a transmission bandwidth of 20 MHz because only P20 channel can be used when the CCA indication of S20 is busy. Similarly, mode 2 720 indicates that the S20 and S40-1 (i.e., one of the two 20 MHz channels of S40 (e.g., channel 52 in FIG. 6)) are busy channels while P20 and S40-2 (i.e., the other of the two 20 MHz channels of S40 (e.g., channel 56 in FIG. 6)) are available channels. Thus mode 2 720 can transmit data over an aggregated bandwidth of 40 MHz, which improves the spectral efficiency by 2 times compared to the legacy systems that only allow a transmission bandwidth of 20 MHz using P20 channel when S20 is indicated as busy the CCA indication.

Analogously, each of mode 3 730 and mode 4 740 is a 160 MHz OFDMA based channel bonding mode. In mode 3 730, the S20 is a busy channel while P20, S40, and S80 are available channels. Thus mode 3 730 has an aggregated bandwidth of 140 MHz, which improves the spectral efficiency by 7 times compared to the legacy systems that only allow a transmission bandwidth of 20 MHz when the CCA indication of S20 is busy. Similarly, mode 4 740 indicates that the S40 is a busy channel while P20, S20, and S80 are available channels. Thus mode 2 720 can transmit data over an aggregated bandwidth of 120 MHz, which improves the spectral efficiency by 3 times compared to the legacy systems that only allow a transmission bandwidth of 40 MHz using P40 (i.e., P20 and S20) when S40 is indicated as busy the CCA indication.

Moreover, the available channels of each of the four channel bonding modes 710, 720, 730, and 740 include at least one HE-SIGB content channel (CC) 1 and at least a HE-SIGB content channel 2 in the primary 80 MHz, which is required by the IEEE 802.11ax for proper detection of the information encoded in the HE-SIGB field. As such, the signaling scheme does not require any changes of current SIGB encoding structure ("[1 2 1 2]" structure), where all even 20 MHz sub-channels transmit the same content as in CC2, and all odd 20 MHz sub-channels transmit the same content as in CC1.

In some implementations, in terms of CCA operations, modes 710, 730, and 740 are backward compatible with 802.11ac systems in that they rely on the same CCA operations of secondary channels (e.g., S20, S40, S80) as defined in IEEE 802.11ac for identifying the busy channel and thus determining the corresponding channel bonding mode. For determining the mode 2 720, the device needs to be able to perform CCA operation on the 20 MHz sub-channel of the S40 channel, for example, by performing per-20 MHz energy detection (ED) in the S40.

In some implementations, an indication of a device's capability for supporting each of the channel bonding modes can be transmitted to one or more receivers during an association phase of the device and the receivers. For example, a 4-bit capability signaling can be defined to indicate whether each of the four channel bonding modes 710, 720, 730, and 740 is enabled or not (e.g., one bit for each mode). The capability signaling can be exchanged during an association phase where the MAC capability exchange occurs. In some implementations, a single-bit capability signaling can be defined to indicate whether the hardware supports per-20 MHz ED. If so, the device can be regarded as capable of supporting all four channel bonding modes 710, 720, 730, and 740.

In some implementations, the described signaling scheme does not require spectral mask change for the different channel bonding modes. For example, in the above four channel bonding modes 710, 720, 730, and 740, the transmitted waveforms only need to conform to the original 80 MHz or 160 MHz masks; no change to the time-domain design is required and thus allows easy and simple system design and implementation.

In some implementations, a channel bonding mode can be signaled using both the HE-SIGA field and the HE SIG-B field. In some implementations, a channel bonding mode can be a combination of two or more sub-channel-bonding modes. For example, a 160 MHz channel bonding mode can include two sub-channel-bonding modes: a primary channel bonding mode of a primary 80 MHz channel (P80) and a secondary channel bonding mode of a secondary 80 MHz channel (S80). For example, the 3-bit BW field in the HE SIG-A field can be used to indicate the primary channel bonding mode out of a subset of candidate primary channel bonding modes of P80 of the 160 MHz channel. In some implementations, three candidate primary channel bonding modes, M1, M2 and M3, are selected. M1 is a channel bonding mode whose available channel occupies a full band of P80. M2 is a channel bonding mode with a busy channel S20 punctured in P80 as shown in Mode 3 730 in FIG. 7. M3 is a channel bonding mode with a busy channel S40 punctured in P80 as shown in Mode 4 740 in FIG. 7. With the 3-bit BW field in the HE SIG-A field to indicate one of the three primary channel bonding modes of P80, the HE SIG-B field can be used to signal a secondary channel bonding mode out of a set of secondary channel bonding modes of S80. Note that the three primary channel bonding modes each include at least one HE-SIGB content channel 1 and at least a HE-SIGB content channel 2 on the P80, and thus make sure that the available channels of each of the overall channel bonding modes includes at least one HE-SIGB content channel 1 and at least a HE-SIGB content channel 2 on the P80.

Figure 8:
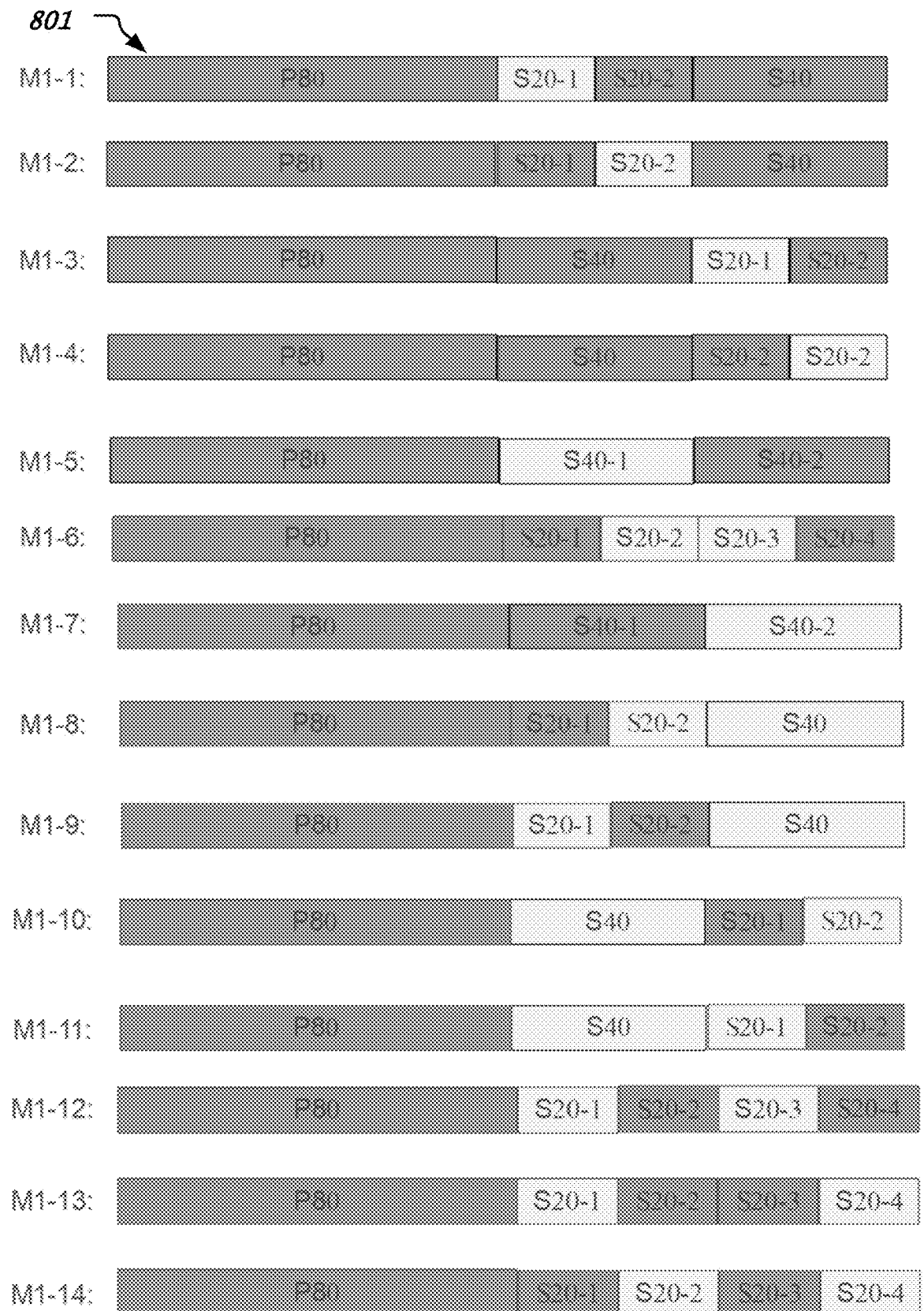
FIG. 8 shows examples of channel bonding modes that can be signaled by a HE-SIGB field.

FIG. 8 shows examples 801 of channel bonding modes that can be signaled by a HE-SIGB field. There can be various combinations of available channels and busy channels on the S80. For example, every sub-channel of 20 MHz can be on and off independently, so there are $2^4-2=14$ different modes, which are denoted as M1-1, M1-2, . . . and M1-14 in FIG. 8. The 14 secondary channel bonding modes of S80 can be combined with each of the three primary channel bonding modes of P80 (i.e., M1, M2 and M3), and thus a total of 3*14=42 160 MHz channel bonding modes can be signaled by the HE-SIGA field and the HE SIG-B field. Take M1 for example, with P80 fully occupied, the 14 different secondary channel bonding modes of S80 are shown in FIG. 8. Similarly, for M2 and M3, another 28 channel bonding modes can be constructed. In some implementations, a subset of the 14 secondary channel bonding modes of S80 can be chosen and signaled by the HE SIG-B field. For example, the HE SIG-B field can be used to signal one out of a few (less than 14) secondary channel bonding modes that have certain desired properties. For example, the selected secondary channel bonding modes have the [1 2 1 2] SIGB encoding structure, which allows a receiver to decode on P80 channels only to get all HE-SIG-B information, whereas in other channel bonding modes, S80 may not have a complete set of [1 2], so the receiver has to rely on P80 to decode the HE-SIG-B. Similarly, a subset of the total 42 160 MHz channel bonding modes can be selected and signaled using the HE-SIGA field and the HE SIG-B field.

In some implementations, more flexible channel bonding mode designs can be signaled by using the HE-SIGA field and the HE SIG-B field. For example, a channel bonding mode can be a combination of two or more sub-channel-bonding modes. In some implementations, each of the two or more sub-channel-bonding modes indicate the occupancy on a subset of specified channels. For example, a channel bonding mode can include a first sub-channel-bonding mode of a first subset of channels, and a second sub-channel-bonding mode of a second subset of channels.

Figure 9A:
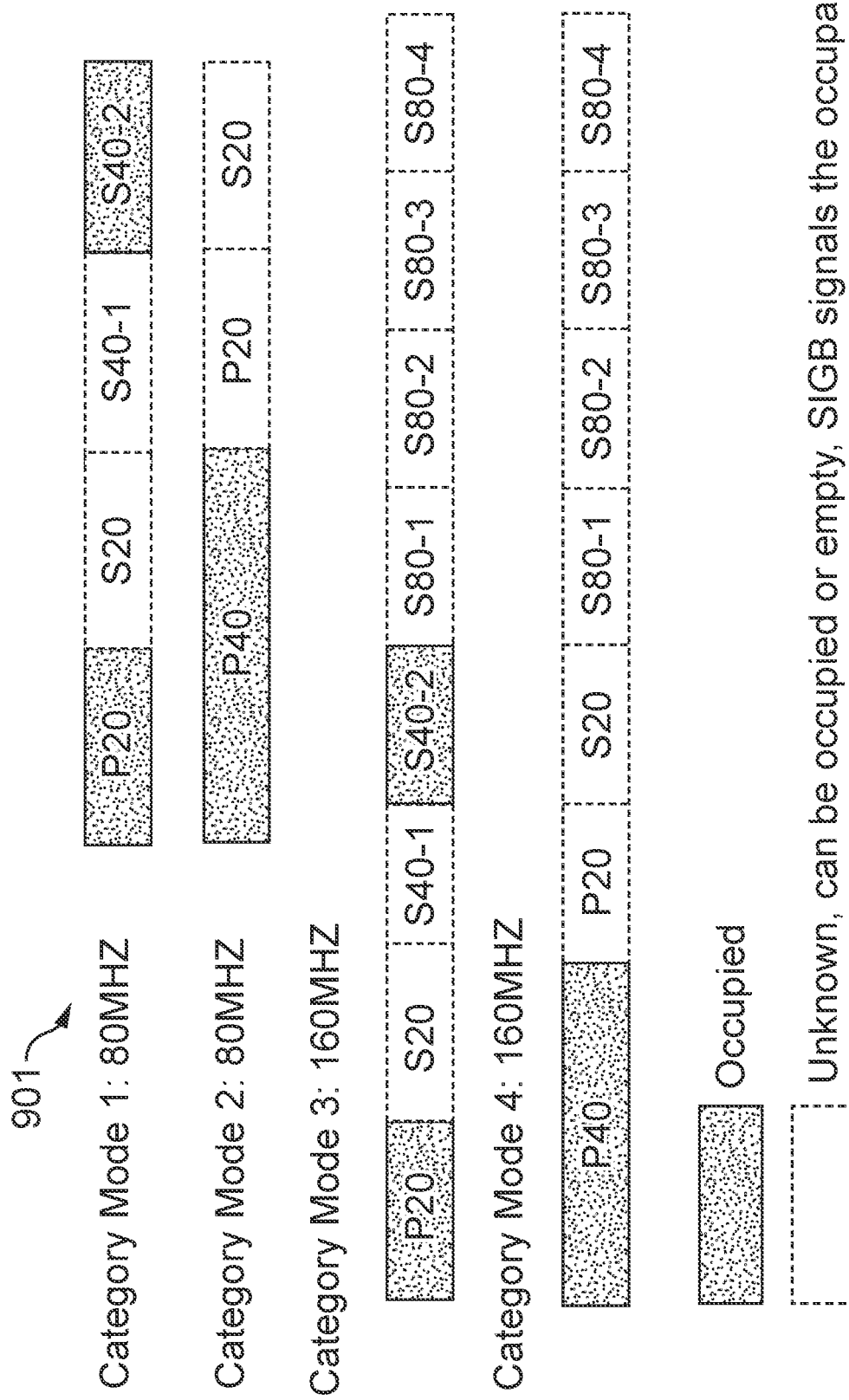
FIG. 9A shows an example of different channel bonding modes that can be signaled by both a BW field of a HE-SIGA field and a HE-SIGB field.

FIG. 9A shows an example of different channel bonding modes 901 that can be signaled by both a BW field of a HE-SIGA field and a HE-SIGB field. The different channel bonding modes are divided into four category modes, which can be signaled by the 3-bit BW field of the HE SIG-A field. Each of the category modes corresponds to a specified subset of channels and indicates that the corresponding specified subset of channels are occupied or used (i.e., are available channels for the respective category mode). For example, as shown in FIG. 9A, the available channels of category mode 1 of 80 MHz include at least P20 and S40-2; the available channels of category mode 2 of 80 MHz include at least P40; the available channels of category mode 3 of 160 MHz include at least P20 and S40-2; the available channels of category mode 4 of 160 MHz include at least P40. Note that the four category modes each include at least one HE-SIGB content channel 1 and at least a HE-SIGB content channel 2 on the P80, and thus make sure that the available channels of each of the overall channel bonding modes include at least one HE-SIGB content channel 1 and at least a HE-SIGB content channel 2 on the P80.

The HE-SIGB field can be used to indicate whether each of the rest of the channels is occupied by the device (i.e., an available channel for use by the device) or empty (i.e., a busy channel that has been used by other devices). For example, the RU Allocation subfield of HE-SIG-B can signal the occupancy of each 20 MHz sub-channel. For 80 MHz, the total number of RU Allocation bits is 16, and for 160/80+80 MHz, the number of RU Allocation bits is 32. For example, as shown in FIG. 9A, for category mode 1 of 80 MHz, at least P20 and S40-2 are occupied, the occupancy of the other two 20 MHz bands is further signaled by SIGB bits. For category mode 2 of 80 MHz, at least P40 is occupied, the occupancy of the other two 20 MHz bands is further signaled by SIGB bits. For category mode 3 of 160 MHz, at least P20 and S40-2 are occupied, the occupancy of the other two 20 MHz bands and all sub 20 MHz bands in S80 are further signaled by SIGB bits, S80 can have any partial occupancy. For category mode 4 of 160 MHz, at least P40 is occupied, the occupancy of the other two 20 MHz bands and all sub 20 MHz bands in S80 is further signaled by SIGB bits, S80 can have any partial occupancy. Additional or different categorization and combination can be designed.

Figure 9B:
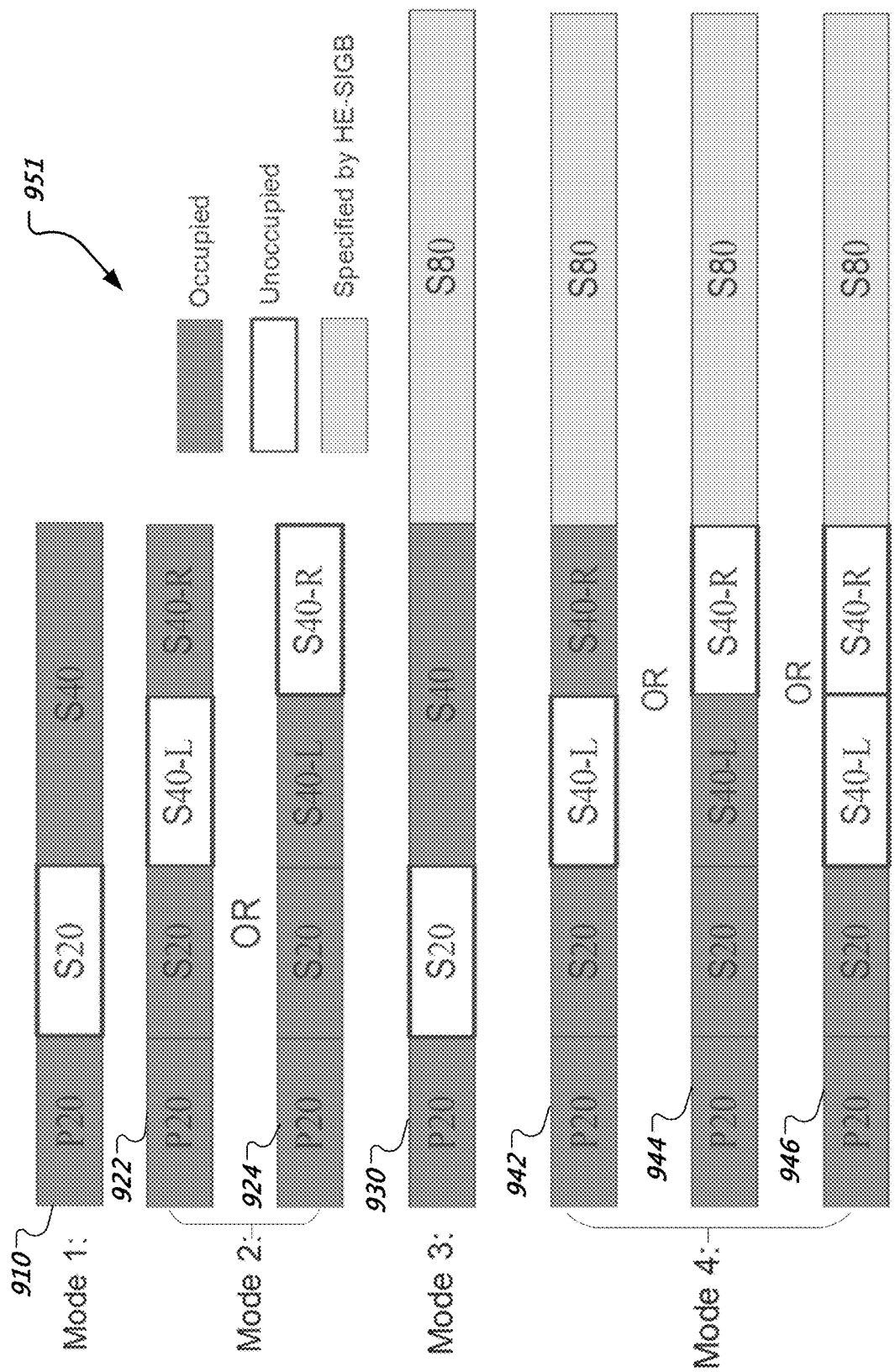
FIG. 9B shows another example of different channel bonding modes that can be signaled by both a BW field of a HE-SIGA field and a HE-SIGB field.

FIG. 9B shows another example of different channel bonding modes 951 that can be signaled by both a BW field of a HE-SIGA field and a HE-SIGB field. The different channel bonding modes are divided into four category modes, which can be signaled by the 3-bit BW field of the HE SIG-A field. Each of the category modes corresponds to a specified subset of channels and indicates that the corresponding specified subset of channels are occupied (i.e., are available channels for the respective category mode) or unoccupied (i.e., are unavailable channels for the respective category mode). As shown in FIG. 9B, category mode 1 of 80 MHz includes a channel bonding mode 910 that includes available channels of P20 and S40 and unavailable channel S20. Category mode 2 of 80 MHz includes two channel bonding modes 922 and 934 that both include available channels P20 and S20. While the channel bonding mode 922 further includes available channel S40-R (e.g., S40-2) and unavailable channel S40-L (e.g., S40-1), and the channel bonding mode 934 further includes available channel S40-L (e.g., S40-1) and unavailable channel S40-R (e.g., S40-2).

Category mode 3 and category mode 4 are both of 160 MHz. The occupancies of the sub-channels on the P80 are signaled by the 3-bit BW field of the HE SIG-A field, while the occupancies of the sub-channels on the S80 are signaled by the HE-SIGB field (e.g., RU Allocation subfield of HE-SIG-B) as discussed above. The category mode 3 includes a channel bonding mode 930 that includes available channels of P20 and S40 and unavailable channel S20. The category mode 4 includes channel bonding modes 942, 944 and 946 that all include available channels P20 and S20. While the channel bonding mode 942 further includes available channel S40-R (e.g., S40-2) and unavailable channel S40-L (e.g., S40-1), the channel bonding mode 944 further includes available channel S40-L (e.g., S40-1) and unavailable channel S40-R (e.g., S40-2), and the channel bonding mode 946 further includes unavailable channel S40-L (e.g., S40-1) and unavailable channel S40-R (e.g., S40-2).

The category modes can further be combined with different channel bonding modes on the S80, giving rise to various channel bonding modes of 160 MHz. Besides the examples shown in FIGS. 9A-B, additional or different channel bonding modes can be selected to be signaled by both a BW field of a HE-SIGA field and a HE-SIGB field.

Figure 10:
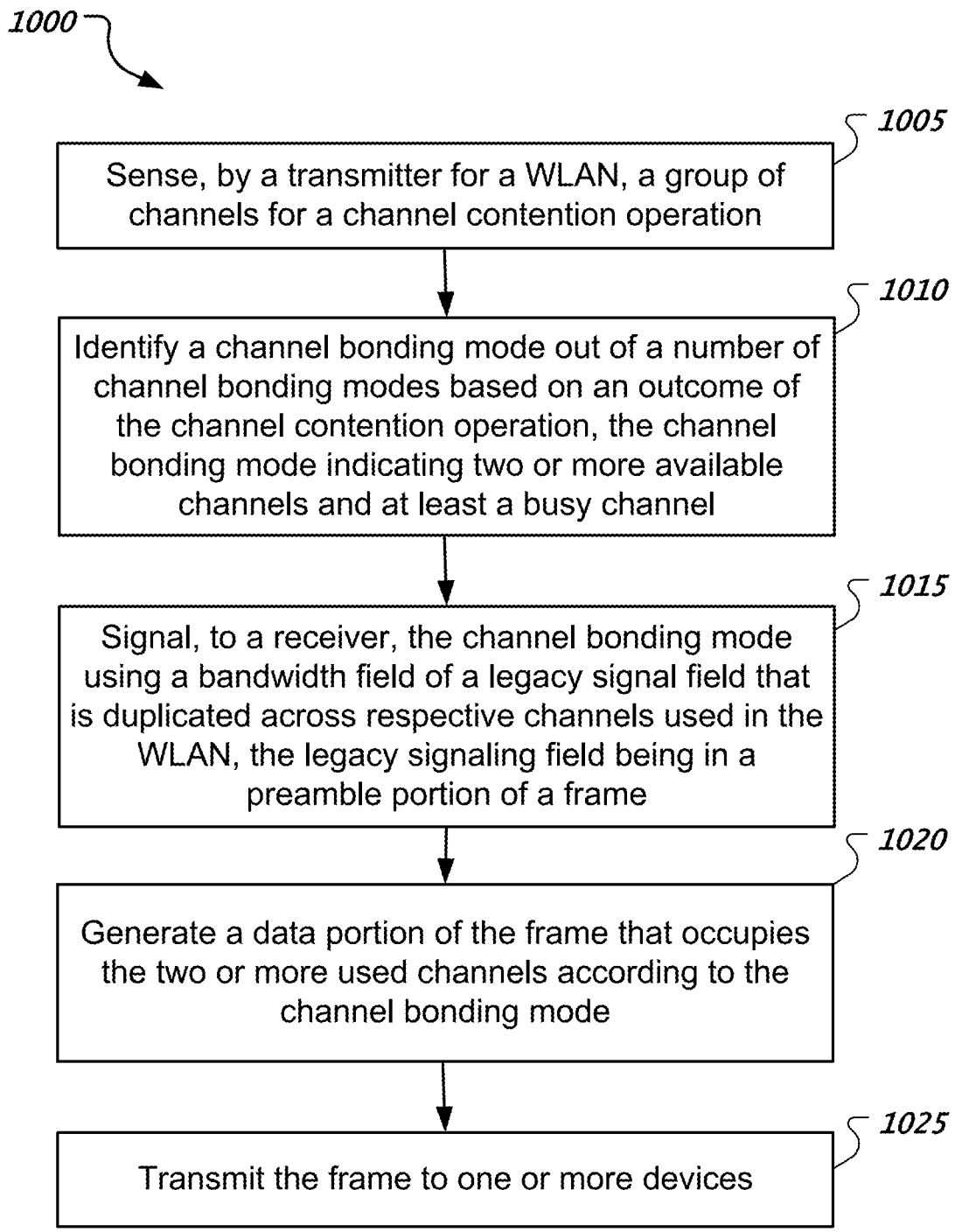
FIG. 10 shows a flowchart of an example of a channel bonding signaling process.

FIG. 10 shows a flowchart of an example of a channel bonding signaling process 1000. FIG. 10 may utilize any of the concepts described in connection with FIGS. 1-9. At 1005, the process includes sensing, by a transmitter (e.g., an AP) for a wireless local area network (WLAN), a group of channels (e.g., the P20, S20, P40, S50, etc. shown in FIG. 6) for a channel contention operation. Sensing the group of channels can include monitoring for traffic on each channel of the group of channels. In some implementations, sensing the group of channels can include performing a CCA. In some implementations, a PHY layer can generate a CCA indication that indicates each channel of the group of channels that is busy. Based on the CCA indication, a higher layer such as a MAC layer can select channels for channel bonding.

At 1010, the process includes identifying a channel bonding mode out of a number of channel bonding modes. The channel bonding mode includes two or more available channels used by the transmitter for data transmission in the WLAN. The two or more available channels indicate at least one busy channel not used by the transmitter for data transmission.

In some implementations, the channel bonding mode is identified based on an outcome of the channel contention operation. Based on a channel traffic detection, the channel contention operation can identify one or more busy channels out of the group of channels. Based on a lack of channel traffic detection or at least a lack of a signal exceeding a minimum threshold, the channel contention operation can identify one or more available or acquired channels out of the group of channels. In some implementations, a channel bonding mode can be determined based on information from a channel contention operation and from a Station Management Entity (SME). When an AP creates a new BSS, the AP can select its operation channel bandwidth based on the parameters provided in a MLME-START.request primitive generated by the SME. The AP can keep operating at its selected channel bandwidth, and use the OFDMA-based channel bonding mechanism to maximize the utilization of the available channels.

At 1015, the process includes signaling, to a receiver, the channel bonding mode using a bandwidth field of a legacy signal field that is duplicated across respective channels used in the WLAN (e.g., the two or more available channels). The legacy signal field is in a preamble portion of a frame. In some implementations, the legacy signal field is a high efficiency (HE) signal A field (HE-SIGA) defined in accordance with an Institute of Electrical and Electronics Engineers (IEEE) 802.11ax protocol of a frame. In some implementations, the bandwidth field of the legacy signal field is a 3-bit field. Note that the at least one busy channel can be in between the two or more available channels such that the two or more available channels form a non-continuous channel grouping. In some implementations, each of the number of channel bonding modes includes available channels, and the available channels include at least a high efficiency (HE) signal B field (HE-SIGB) content channel 1 and at least a HE-SIGB content channel 2.

In some implementations, identifying the channel bonding mode out of the number of channel bonding modes includes identifying the channel bonding mode from a set of modes including: a first channel bonding mode spanning over a bandwidth of 80 MHz (e.g., the channel bonding mode 710 in FIG. 7) that includes a primary 20 MHz channel and a secondary 40 MHz channel used by the transmitter for data transmission, and indicates a secondary 20 MHz channel not used by the transmitter for data transmission; a second channel bonding mode spanning over a bandwidth of 80 MHz (e.g., the channel bonding mode 720 in FIG. 7) that includes a primary 20 MHz channel and a second 20 MHz channel of a secondary 40 MHz channel, and indicates a secondary 20 MHz channel and a first 20 MHz channel of the secondary 40 MHz channel not used by the transmitter for data transmission; a third channel bonding mode spanning over a bandwidth of 160 MHz (e.g., the channel bonding mode 730 in FIG. 7) that includes a primary 20 MHz channel, a secondary 40 MHz channel, and a secondary 80 MHz channel, and indicates a secondary 20 MHz channel not used by the transmitter for data transmission; and a fourth channel bonding mode spanning over a bandwidth of 160 MHz (e.g., the channel bonding mode 740 in FIG. 7) that includes a primary 20 MHz channel, a secondary 20 MHz channel, and a secondary 80 MHz channel, and indicates a secondary 40 MHz channel not used by the transmitter for data transmission.

In some implementations, the process includes transmitting an indication of capability for supporting each of the number of channel bonding modes to the receiver during an association phase of the transmitter and the receiver.

In some implementations, signaling the channel bonding mode using the bandwidth field of the HE-SIGA field includes signaling the channel bonding mode using the bandwidth field of the HE-SIGA field and a HE-SIGB field. In some implementations, the channel bonding mode includes a primary channel bonding mode of a primary 80 MHz channel, and a secondary channel bonding mode of a secondary 80 MHz channel, for example, as described in connection with FIG. 8. Signaling the channel bonding mode using the bandwidth field of the HE-SIGA field and the HE-SIGB field includes signaling the primary channel bonding mode of the primary 80 MHz channel using the 3-bit bandwidth field of the HE-SIGA field; and signaling the secondary channel bonding mode of the secondary 80 MHz channel using a resource allocation field of the HE-SIGB field.

In some implementations, the channel bonding modes include a first channel bonding mode of a first subset of channels, and a second channel bonding mode of a second subset of channels, for example, as described in connection with FIGS. 9A-B. Signaling the channel bonding mode using the bandwidth field of the HE-SIGA field and the HE-SIGB field includes signaling the first channel bonding mode of the first subset of channels using the bandwidth field of the HE-SIGA field; and signaling the second channel bonding mode of the second subset of channels using a resource allocation field of the HE-SIGB field, the resource allocation field of the HE-SIGB field indicating whether each of the second subset of channels is used by the transmitter for data transmission. In some implementations, the first channel bonding mode is one of four channel bonding modes, each of the four channel bonding modes includes available channels, and the available channels include at least a HE-SIGB content channel 1 and at least a HE-SIGB content channel 2. For example, as shown in FIG. 9B, in some implementations, the first channel bonding mode of the first subset of channels includes the first channel bonding mode from a set of: a third channel bonding mode spanning over a bandwidth of 80 MHz, including a primary 20 MHz channel and a secondary 40 MHz channel used by the transmitter for data transmission, and indicating a secondary 20 MHz channel not used by the transmitter for data transmission; a fourth channel bonding mode spanning over a bandwidth of 80 MHz, including a primary 20 MHz channel, a secondary 20 MHz channel, and one 20 MHz channel of a secondary 40 MHz channel, and indicating another 20 MHz channel of the secondary 40 MHz channel not used by the transmitter for data transmission; a fifth channel bonding mode spanning over a bandwidth of 160 MHz, including a primary 20 MHz channel, a secondary 40 MHz channel, and indicating a secondary 20 MHz channel not used by the transmitter for data transmission; and a sixth channel bonding mode spanning over a bandwidth of 160 MHz, including a primary 20 MHz channel, a secondary 20 MHz channel, and at most one 20 MHz channel of a secondary 40 MHz channel, and indicating at least one other 20 MHz channel not used by the transmitter for data transmission.

In some implementations, the process includes generating the preamble portion of the frame that includes the signaling of the channel bonding mode. In some implementations, generating the preamble portion can include duplicating the legacy signal field on each of the available channels within the preamble portion. In some implementations, generating the preamble portion can include duplicating the legacy preamble on the busy channel within the preamble portion. In some implementations, generating the preamble portion can include setting subcarriers that correspond to the busy channel to null values for at least a portion of the preamble portion. Generating the preamble portion can include causing a PHY layer to create an OFDMA-based waveform.

At 1020, the process includes generating a data portion of the frame that occupies the two or more available channels according to the channel bonding mode. In some implementations, generating a data portion of the frame includes setting subcarriers that correspond to the acquired channels to data values and setting second subcarriers that correspond to the busy channel to null values. The process can include causing to be unused one or more subcarriers that correspond to an edge region of the acquired channels to minimize interference to the busy channel. The edge region can be adjacent to the busy channel in a frequency domain. Generating the data portion can include causing a PHY layer to create an OFDMA-based waveform. At 1025, the process includes transmitting the frame to one or more devices.

A device (e.g., an AP) can include an interface to access a wireless medium and processor electronics coupled with the interface. The processor electronics can be configured to identify a channel bonding mode out of a number of channel bonding modes. The channel bonding mode includes two or more available channels used by the transmitter for data transmission in the WLAN, and the two or more available channels indicate at least one busy channel not used by the transmitter for data transmission. The processor electronics can be configured to signal, to a receiver, the channel bonding mode using a bandwidth field of a legacy signal field that is duplicated across respective channels used in the WLAN. The legacy signal field is in a preamble portion of a frame. The processor electronics can be configured to control, via the interface, a transmission of the frame to the receiver, wherein the frame includes a data portion of the frame that occupies the two or more available channels according to the channel bonding mode.

In some implementations, the processor electronics can be configured to control sensing of a group of channels for a channel contention operation that acquires, from the group of channels, the two or more available channels and detects the at least one busy channel; and determine the channel bonding mode based on the channel contention operation.

In some implementations, the legacy signal field is a high efficiency (HE) signal A field (HE-SIGA) defined in accordance with an Institute of Electrical and Electronics Engineers (IEEE) 802.11ax protocol of a frame. The processor electronics can be configured to generate the preamble portion of the frame that includes the 3-bit field of the HE-SIGA field that indicates the channel bonding mode; and generate the data portion of the frame that occupies the two or more available channels according to the channel bonding mode. The processor electronics can be configured to duplicate a legacy signal field on each of the available channels within the preamble portion. The processor electronics can be configured to set first subcarriers that correspond to the acquired channels to data values within the data portion. The processor electronics can be configured to set second subcarriers that correspond to the busy channel to null values for at least a portion of the data portion of the frame. In some implementations, the processor electronics can be configured to control, via the interface, a transmission of an indication of capability of supporting each of the number of channel bonding modes to the receiver during an association phase of the apparatus and the receiver.

Figure 11:
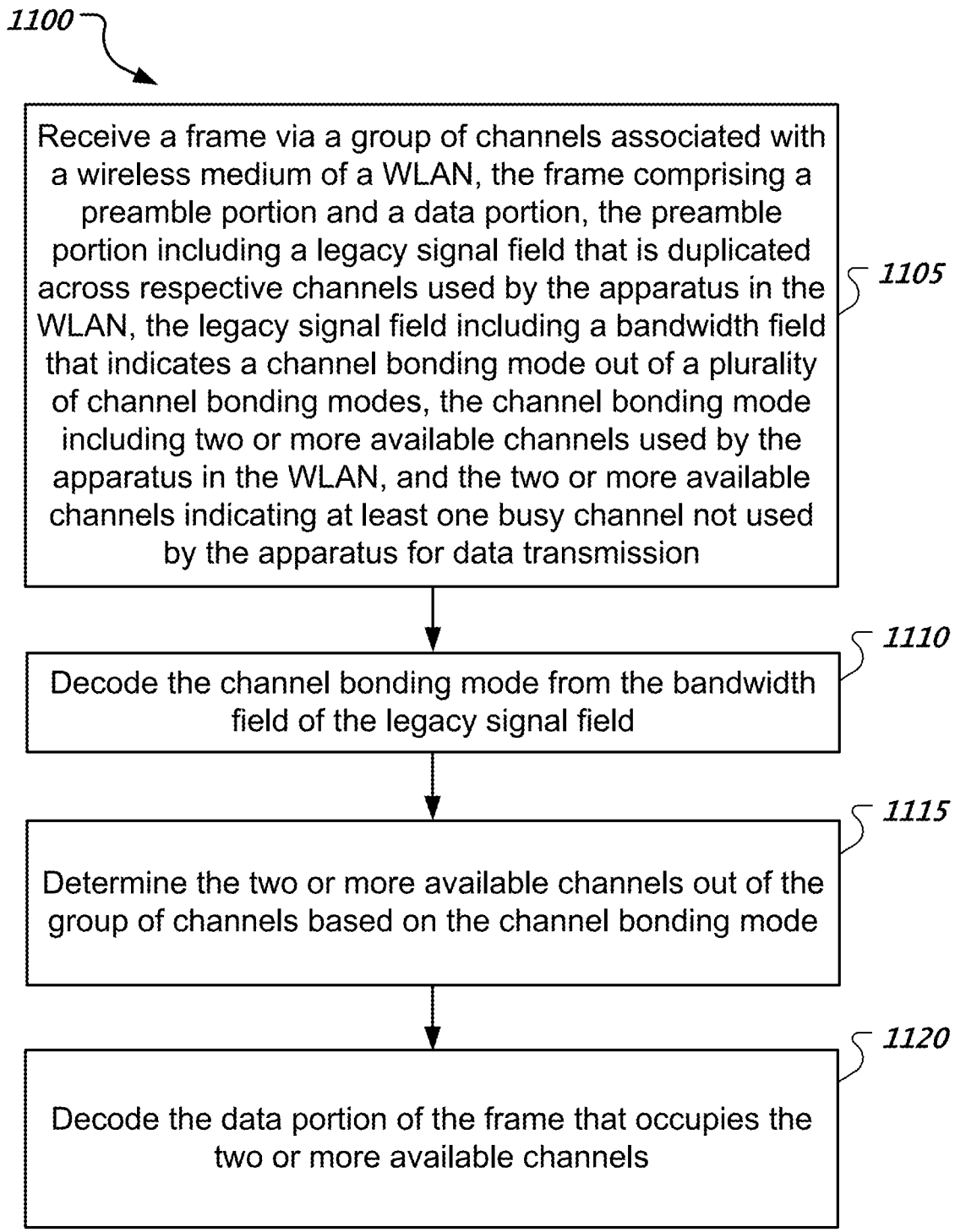
FIG. 11 shows a flowchart of an example of a receiver process.

FIG. 11 shows a flowchart of an example of a receiver process 1100 used by a wireless device, such as a client device, that receives a frame that includes a PPDU (e.g., a HE PPDU in the HE-MU format shown in FIG. 5) containing information of a channel bonding mode. FIG. 11 may utilize any of the concepts described in connection with FIGS. 1-10. For example, the receiver process can perform necessary operations corresponding to the example of the channel bonding signaling process 1000 in FIG. 10.

At 1105, the process can receive a frame (e.g., a frame including a HE PPDU in the HE-MU format shown in FIG. 5) via a group of channels associated with the wireless medium, the frame including a preamble portion and a data portion. The preamble portion includes a legacy signal field that is duplicated across respective channels used by the apparatus in the WLAN. The legacy signal field includes a bandwidth field that indicates a channel bonding mode out of a number of channel bonding modes. The channel bonding mode includes two or more available channels used by the apparatus in the WLAN. The two or more available channels indicate at least one busy channel not used by the apparatus for data transmission.

At 1110, the process can decode the channel bonding mode from the bandwidth field of the legacy signal field. At 1115, the process can determine the two or more available channels out of the group of channels based on the channel bonding mode. At 1120, the process can decode the data portion of the frame that occupies the two or more available channels.

A client device can include an interface to access a wireless medium and processor electronics coupled with the interface. The processor electronics can be configured to receive a frame (e.g., a frame including a HE PPDU in the HE-MU format shown in FIG. 5) via a group of channels associated with the wireless medium, the frame including a preamble portion and a data portion. The preamble portion includes a legacy signal field that is duplicated across respective channels used by the apparatus in the WLAN. The legacy signal field includes a bandwidth field that indicates a channel bonding mode out of a number of channel bonding modes. The channel bonding mode includes two or more available channels used by the apparatus in the WLAN. The two or more available channels indicate at least one busy channel not used by the apparatus for data transmission. The processor electronics can be configured to decode the channel bonding mode from the bandwidth field of the legacy signal field; determine the two or more available channels out of the group of channels based on the channel bonding mode; and decode the data portion of the frame that occupies the two or more available channels.

In some implementations, the legacy signal field is a high efficiency (HE) signal A field (HE-SIGA) defined in accordance with an Institute of Electrical and Electronics Engineers (IEEE) 802.11ax protocol (or other next generation WLAN protocol) of a frame, and the bandwidth field of the legacy signal field is a 3-bit field.

In some implementations, the number of channel bonding modes include four channel bonding modes as shown in FIG. 7. The four channel bonding modes include a first channel bonding mode spanning over a bandwidth of 80 MHz, including a primary 20 MHz channel and a secondary 40 MHz channel used by a transmitter for data transmission, and indicating a secondary 20 MHz channel not used by the apparatus for data transmission; a second channel bonding mode spanning over a bandwidth of 80 MHz, including a primary 20 MHz channel and a second 20 MHz channel of a secondary 40 MHz channel, and indicating a secondary 20 MHz channel and a first 20 MHz channel of the secondary 40 MHz channel not used by the transmitter for data transmission; a third channel bonding mode spanning over a bandwidth of 160 MHz, including a primary 20 MHz channel, a secondary 40 MHz channel, and a secondary 80 MHz channel, and indicating a secondary 20 MHz channel not used by the transmitter for data transmission; and a fourth channel bonding mode spanning over a bandwidth of 160 MHz, including a primary 20 MHz channel, a secondary 20 MHz channel, and a secondary 80 MHz channel, and indicating a secondary 40 MHz channel not used by the transmitter for data transmission.

In some implementations, decoding the channel bonding mode from the bandwidth field of the legacy signal field includes decoding the channel bonding mode from the bandwidth field of the legacy signal field (e.g., the 3-bit field of the HE-SIGA field) and from a HE-SIGB field. The channel bonding mode can be encoded in the preamble portion of the frame according to the example techniques described in connection with FIGS. 8 and 9. Accordingly, the channel bonding mode can be decoded from the 3-bit field of the HE-SIGA field and from the HE-SIGB field according to an inverse-mapping between a specific channel bonding mode and the 3-bit field of the HE-SIGA field and the HE-SIGB field. For example, if the channel bonding mode is encoded by using the 3-bit field of the HE-SIGA field and from the HE-SIGB field according to the signaling scheme described in connection with FIG. 8, the channel bonding mode is one of the 33 selected channel bonding modes. The receiver can determine which one of the three primary channel bonding modes of P80 (i.e., M1, M2 and M3) the transmitter uses based on the 3-bit field of the HE-SIGA field, and determine which one of the 11 secondary channel bonding modes of S80 the transmitter uses based on the HE-SIGB field. An overall channel bonding mode on the entire 160 MHz bandwidth is thus a combination of the decoded primary channel bonding mode of P80 and the decoded secondary channel bonding mode S80.

For example, at the receiving side of a PPDU with OFDMA-based downlink channel bonding, in some implementations, a client device receives and decodes the HE-SIGA in the preamble of the PPDU, and then uses the information of a channel bonding mode in HE-SIGA to determine which component channel or channels to receive the resource allocation signals, e.g., HE-SIGB-CC1 and HE-SIGB-CC2. After receiving and decoding the resource allocation signals, if there is a downlink resource allocation to the client device, then the client device receives and decodes the data portion on the given downlink resource allocation. In some implementations, an example of a receiver process can include detecting a valid start of the PPDU, receiving and decoding HE-SIGA in the preamble of the PPDU; and using the channel bonding indication information in the HE-SIGA of the preamble to determine the channels for HE-SIGB-CC1 and HE-SIGB-CC2. The process can receive and decode HE-SIGB-CC1 and HE-SIGB-CC2 to determine if there is downlink data for the client device in the PPDU. The process can determine a resource allocation. In some implementations, the preamble includes a resource allocation block. In some implementations, the resource allocation is signaled in a frame before the PPDU. The process can receive and decode the data based on the resource allocation.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination, in a single embodiment. Conversely, various features that are described in the context of a single embodiment can also be implemented in multiple embodiments, separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A wireless communication device, comprising:
processor electronics configured to
select a channel bonding mode from a plurality of channel bonding modes, wherein (i) each of the plurality of channel bonding modes indicates at least two wireless communication channels and (ii) at least one of the plurality of channel bonding modes corresponds to a mode that indicates a punctured wireless communication channel, and
generate a frame to be transmitted from the wireless communication device in accordance with the selected channel bonding mode, wherein (i) the frame includes a preamble portion and a data portion and (ii) the preamble portion includes a first preamble field and a second preamble field, (iii) the first preamble field is a bandwidth field of a high efficiency (HE) signal A (HE-SIG-A) field and the second field is an HE signal B (HE-SIG-B) field, wherein the HE-SIG-A and HE-SIG-B fields include multiple subfields indicating transmission parameters, and (iv) the selected channel bonding mode is indicated by a combination of contents of the first preamble field and the second preamble field, wherein the contents of the first preamble field indicate one of a first set of channel bonding modes corresponding to a primary channel bonding mode, the contents of the second preamble field indicate one of a second set of channel bonding modes corresponding to a secondary channel bonding mode, and each of the channel bonding modes in the first set of channel bonding modes includes at least one HE-SIG-B content channel 1 and at least one HE-SIG-B content channel 2 in a primary 80 MHz channel; and
transceiver electronics configured to transmit the frame on the wireless communication channels indicated by the selected channel bonding mode identified in the combination of the contents of the first preamble field and the second preamble field.

2. The wireless communication device of claim 1, wherein the first preamble field indicates whether the selected channel bonding mode includes a punctured wireless communication channel.

3. The wireless communication device of claim 1, wherein the bandwidth field is a three bit field.

4. The wireless communication device of claim 1, wherein the bandwidth field indicates both channel bonding modes that do not include a punctured wireless communication channel and channel bonding modes that include a punctured wireless communication channel.

5. The wireless communication device of claim 4, wherein the channel bonding modes that include a punctured wireless communication channel include (i) a punctured secondary 20 MHz (S20) channel and (ii) a punctured secondary 40 MHz (S40) channel.

6. The wireless communication device of claim 1, wherein the transceiver electronics are further configured to transmit the preamble portion on each of the wireless communication channels indicated by the selected channel bonding mode.

7. The wireless communication device of claim 1, wherein the wireless communication channels indicated by the selected channel bonding mode include at least two available wireless communication channels and at least one busy wireless communication channel.

8. The wireless communication device of claim 1, wherein the first set of channel bonding modes includes a plurality of category modes, and wherein each of the plurality of category modes corresponds to a specified subset of channels.

9. A method for operating a wireless communication device, the method comprising:
selecting a channel bonding mode from a plurality of channel bonding modes, wherein (i) each of the plurality of channel bonding modes indicates at least two wireless communication channels and (ii) at least one of the plurality of channel bonding modes corresponds to a mode that indicates a punctured wireless communication channel;
generating a frame to be transmitted from the wireless communication device in accordance with the selected channel bonding mode, wherein (i) the frame includes a preamble portion and a data portion and (ii) the preamble portion includes a first preamble field and a second preamble field, (iii) the first preamble field is a bandwidth field of a high efficiency (HE) signal A (HE-SIG-A) field and the second field is an HE signal B (HE-SIG-B) field, wherein the HE-SIG-A and HE-SIG-B fields include multiple subfields indicating transmission parameters, and (iv) the selected channel bonding mode is indicated by a combination of contents of the first preamble field and the second preamble field, wherein the contents of the first preamble field indicate one of a first set of channel bonding modes corresponding to a primary channel bonding mode, the contents of the second preamble field indicate one of a second set of channel bonding modes corresponding to a secondary channel bonding mode, and each of the channel bonding modes in the first set of channel bonding modes includes at least one HE-SIG-B content channel 1 and at least one HE-SIG-B content channel 2 in a primary 80 MHz channel; and
transmitting the frame on the wireless communication channels indicated by the selected channel bonding mode identified in the combination of the contents of the first preamble field and the second preamble field.

10. The method of claim 9, further comprising using the first preamble field to whether the selected channel bonding mode includes a punctured wireless communication channel.

11. The method of claim 9, wherein the bandwidth field is a three bit field, the method further comprising setting the three bit field to indicate the selected channel bonding mode.

12. The method of claim 9, further comprising setting the bandwidth field to indicate channel bonding modes that do not include a punctured wireless communication channel and channel bonding modes that include a punctured wireless communication channel.

13. The method of claim 12, wherein the channel bonding modes that include a punctured wireless communication channel include (i) a punctured secondary 20 MHz (S20) channel and (ii) a punctured secondary 40 MHz (S40) channel.

14. The method of claim 9, further comprising transmitting the preamble portion on each of the wireless communication channels indicated by the selected channel bonding mode.

15. The method of claim 9, wherein the wireless communication channels indicated by the selected channel bonding mode include at least two available wireless communication channels and at least one busy wireless communication channel.

16. The method of claim 9, wherein the first set of channel bonding modes includes a plurality of category modes, and wherein each of the plurality of category modes corresponds to a specified subset of channels.

\* \* \* \* \*